US008103381B2

(12) United States Patent
Fukawa

(10) Patent No.: US 8,103,381 B2
(45) Date of Patent: Jan. 24, 2012

(54) LASER PROCESSING ROBOT CONTROL SYSTEM, CONTROL METHOD AND CONTROL PROGRAM MEDIUM

(75) Inventor: Hiromitsu Fukawa, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 965 days.

(21) Appl. No.: 12/063,846

(22) PCT Filed: Oct. 6, 2006

(86) PCT No.: PCT/IB2006/002795
§ 371 (c)(1),
(2), (4) Date: Feb. 14, 2008

(87) PCT Pub. No.: WO2007/042895
PCT Pub. Date: Apr. 19, 2007

(65) Prior Publication Data
US 2010/0174407 A1 Jul. 8, 2010

(30) Foreign Application Priority Data

Oct. 7, 2005 (JP) ................................. 2005-295415

(51) Int. Cl.
*G06F 19/00* (2011.01)
(52) U.S. Cl. ......................... 700/245; 700/166; 700/259
(58) Field of Classification Search .................. 700/166, 700/245, 259; 219/121.6, 121.79, 121.78
See application file for complete search history.

(56) References Cited

U.S. PATENT DOCUMENTS

| 4,150,326 | A |   | 4/1979 | Engelberger et al. |
| 4,568,816 | A | * | 2/1986 | Casler, Jr. ................ 219/124.34 |
| 4,584,455 | A | * | 4/1986 | Tomizawa ................ 219/121.68 |
| 4,621,333 | A | * | 11/1986 | Watanabe ...................... 700/257 |
| 4,831,316 | A | * | 5/1989 | Ishiguro et al. ............... 700/254 |
| 4,951,218 | A | * | 8/1990 | Okumura et al. ............. 700/212 |
| 4,998,050 | A | * | 3/1991 | Nishiyama et al. ........... 700/248 |

(Continued)

FOREIGN PATENT DOCUMENTS

EP        1 769 879 A    4/2007

(Continued)

OTHER PUBLICATIONS

The Japanese Office Action of corresponding Japanese Application No. 2005-295415, dated Jun. 20, 2011 and mailed Jun. 28, 2011.

*Primary Examiner* — Khoi Tran
*Assistant Examiner* — Jorge Peche
(74) *Attorney, Agent, or Firm* — Global IP Counselors, LLP

(57) ABSTRACT

A laser processing robot control system is provided with a robot, a laser beam scanning device and a robot controlling apparatus. The laser beam scanning device is movable in a three-dimensional direction with respect to the robot to scan a laser beam on a workpiece. This system selectively positions the robot and the laser beam scanning device to a prescribed position, and controls the laser beam scanning device to scan the laser beam at a processing spot in a scan pattern based on a detected posture of the robot and the scan pattern retrieved from the robot controlling apparatus. The teaching operations for positioning the robot and the laser beam scanning device to the prescribed position are performed independently of the teaching operations for controlling the scanning of the laser beam at the processing spot in the scan pattern.

21 Claims, 17 Drawing Sheets

U.S. PATENT DOCUMENTS

| | | | | |
|---|---|---|---|---|
| 5,006,999 A | * | 4/1991 | Kuno et al. | 700/253 |
| 5,038,292 A | * | 8/1991 | Okumura et al. | 700/212 |
| 5,040,124 A | * | 8/1991 | Okumura et al. | 700/212 |
| 5,153,409 A | * | 10/1992 | Rudaitis et al. | 219/121.83 |
| 5,359,872 A | * | 11/1994 | Nashiki | 72/16.1 |
| 5,670,068 A | * | 9/1997 | Kuriyama et al. | 219/121.68 |
| 6,153,853 A | * | 11/2000 | Maruyama et al. | 219/121.63 |
| 6,476,574 B1 | * | 11/2002 | Nilsson et al. | 318/568.11 |
| 6,596,961 B2 | * | 7/2003 | Ehlers et al. | 219/121.63 |
| 6,763,284 B2 | * | 7/2004 | Watanabe et al. | 700/264 |
| 6,818,858 B2 | * | 11/2004 | Yasoda et al. | 219/121.7 |
| 2003/0078694 A1 | * | 4/2003 | Watanabe et al. | 700/245 |
| 2005/0061781 A1 | * | 3/2005 | Jense | 219/121.8 |
| 2005/0150876 A1 | * | 7/2005 | Menin et al. | 219/121.63 |
| 2008/0035619 A1 | * | 2/2008 | Hamaguchi et al. | 219/121.79 |

FOREIGN PATENT DOCUMENTS

| | | |
|---|---|---|
| JP | H2-75005 A | 3/1990 |
| JP | H09-076179 A | 3/1997 |
| JP | H10-180471 A | 7/1998 |
| JP | 2002-127056 A | 5/2002 |
| JP | 2004-237388 A | 8/2004 |
| JP | 2004-351512 | 12/2004 |

* cited by examiner

AREA TABLE

| ROBOT COORDINATE | [X] | [Y] | [Z] | [α] | [β] | [γ] |
|---|---|---|---|---|---|---|
| WELDING SPOT S(1) | [WELDING PATTERN] | [WIDTH] | [LENGTH] | [WORK COORDINATE SYSTEM: x] | [WORK COORDINATE SYSTEM: y] | [WORK COORDINATE SYSTEM: z] |
| WELDING SPOT S(2) | [WELDING PATTERN] | [WIDTH] | [LENGTH] | [WORK COORDINATE SYSTEM: x] | [WORK COORDINATE SYSTEM: y] | [WORK COORDINATE SYSTEM: z] |
| WELDING SPOT S(3) | [WELDING PATTERN] | [WIDTH] | [LENGTH] | [WORK COORDINATE SYSTEM: x] | [WORK COORDINATE SYSTEM: y] | [WORK COORDINATE SYSTEM: z] |
| ... | ... | ... | ... | ... | ... | ... |
| WELDING SPOT S(N) | [WELDING PATTERN] | [WIDTH] | [LENGTH] | [WORK COORDINATE SYSTEM: x] | [WORK COORDINATE SYSTEM: y] | [WORK COORDINATE SYSTEM: z] |

Fig.10

AREA TABLE

| | | | | | | |
|---|---|---|---|---|---|---|
| Spot Area Upper Left | [Wx Lupper] | [Wy Lupper] | [Wz Lupper] | [Wα Lupper] | [Wβ Lupper] | [Wγ Lupper] |
| Spot Area Lower Right | [Wx Rlow] | [Wy Rlow] | [Wz Rlow] | [Wα Rlow] | [Wβ Rlow] | [Wγ Rlow] |
| Welding Spot S(1) | [Scan Pattern] | [Width] | [Length] | [Workpiece Coordinate System: x] | [Workpiece Coordinate System: y] | [Workpiece Coordinate System: z] |
| Welding Spot S(2) | [Scan Pattern] | [Width] | [Length] | [Workpiece Coordinate System: x] | [Workpiece Coordinate System: y] | [Workpiece Coordinate System: z] |
| Welding Spot S(3) | [Scan Pattern] | [Width] | [Length] | [Workpiece Coordinate System: x] | [Workpiece Coordinate System: y] | [Workpiece Coordinate System: z] |
| ... | ... | ... | ... | ... | ... | ... |
| Welding Spot S(n) | [Scan Pattern] | [Width] | [Length] | [Workpiece Coordinate System: x] | [Workpiece Coordinate System: y] | [Workpiece Coordinate System: z] |

Fig. 15

LASER PROCESSING ROBOT CONTROL SYSTEM, CONTROL METHOD AND CONTROL PROGRAM MEDIUM

CROSS-REFERENCE TO RELATED APPLICATIONS

This application claims priority to Japanese Patent Application No. 2005-295415 filed on Oct. 7, 2005. The entire disclosure of Japanese Patent Application No. 2005-295415 is hereby incorporated herein by reference.

BACKGROUND OF THE INVENTION

1. Field of the Invention

The present invention relates to a laser processing robot control system that facilitates a laser processing teaching operation.

2. Background Information

In general, when a robot performs work, an operator of the robot needs to instruct (teach) the robot how to perform the work. For example, when the robot performs arc welding, the robot needs to be provided with a program written in a robot language regarding arc welding points (positions to move) and arc welding instructions (conditions to perform the arc welding).

Japanese Laid-Open Patent Application Publication 2002-127056 discloses an example of a conventional robot control method in which the consistencies between existing descriptive instructions and newly input instructions are monitored when the movement of the robot is changed. If it is determined that the newly input instructions are inconsistent with the existing descriptive instructions, then either the comparison result is displayed, or the input of instructions is restricted to prevent a descriptive error in the program.

Therefore, it is theoretically possible for a robot to perform any movements for any work by writing a program for the robot. For example, in the case of an arc welding, a robot continuously works on a locus of tool center points (TCP) while the movement of each axis of the robot is controlled. In this arc welding case, there are not many teaching points when a bead shape at a welding point is substantially linear. Thus, the arc welding can be performed by the robot if the robot is instructed with the following program including arc welding points and arc welding instructions.

001: MOVE (movement form, movement speed A, welding start point)
002: STARTARC (current value, voltage value, movement speed B)
003: MOVE (movement form, movement speed A, welding continuation point)
004: MOVE (movement form, movement speed A, welding end point)

Also, when controlling a spot welding robot to work on a locus of TCP while temporarily suspending the robot at a given point, the spot welding work can be performed by the robot if the robot is instructed with the following program including spot welding points (movement to the TCP) and spot welding instructions (parameters such as an energizing cycle number, a current value, and a welding force).

001: MOVE (instruction point A, movement speed A)
Spot welding instruction (energizing cycle number, current value, welding, force)
002: MOVE (instruction point B, movement speed B)
Spot welding instruction (energizing cycle number, current value, welding force)

In view of the above, it will be apparent to those skilled in the art from this disclosure that there exists a need for an improved laser processing robot control apparatus, laser processing robot control method and laser processing robot control program. This invention addresses this need in the art as well as other needs, which will become apparent to those skilled in the art from this disclosure.

SUMMARY OF THE INVENTION

In the conventional robot control method as discussed above, a variety of problems occur when a shape of the processing spot is not linear but, for example, an S-shape, a circular shape or the like, in order to accommodate demand to improve the processing quality, etc. Such problems include taking a long time for the teaching operation and extreme difficulty of changing the instruction contents if the program is required to be changed.

For example, the laser welding is performed with the conventional robot program control method wherein the welding shape is set to an S-shape that comprises 80 dots sequences. If the laser welding is performed with this welding shape using the conventional method in which the robot is stopped and an arm of the robot is disposed at a fixed position as illustrated in the following program, it is almost impossible to create and adjust the program on-the-spot because there are too many positioning points of a scanner control axis for scanning the laser beam.

Program for the first point

---
001: MOVE (robot stop position A, scanner position S (1-1), movement speed A, laser oscillation ON instruction, output value)
002: MOVE (robot stop position A, scanner position S (1-2), movement speed A, laser oscillation ON instruction, output value)
...
079: MOVE (robot stop position A, scanner position S (1-79), movement speed A, laser oscillation ON instruction, output value)
080: MOVE (robot stop position A, scanner position S (1-80), movement speed A, laser oscillation ON instruction, output value)
---

Program for the second point

---
081: MOVE (robot stop position A, scanner position S (2-1), movement speed A, laser oscillation ON instruction, output value)
082: MOVE (robot stop position A, scanner position S (2-2), movement speed A, laser oscillation ON instruction, output value)
...
159: MOVE (robot stop position A, scanner position (2-79), movement speed A, laser oscillation ON instruction, output value)
160: MOVE (robot stop position A, scanner position (2-80), movement speed A, laser oscillation ON instruction, output value).
--- movement speed A, laser oscillation ON instruction, output value).

On the other hand, if laser welding is performed with the welding shape of the S-shape using a conventional robot control method in which the robot moves while the arm of the robot moves, unlike the above case, it is necessary to give instructions to the robot regarding the locus of the arm and the TCP locus positions of the scanner control axis. According to the conventional robot control method, three coordinates are given as instructions including a first coordinate where the arm of the robot is about to reach a curve, a second coordinate where the arm is at the curve apex, and a third coordinate after the arm passes the curve. According to this conventional robot program control, the arm locus varies depending on the movement speed of the robot at playback (override value), and thus, the scanner controlling axis cannot determine where to emit a laser beam or where to start laser welding.

Thus, an object of the present invention is to solve the problems in the conventional robot control method described above, and to provide a laser processing robot control apparatus, a laser processing robot control method, and a laser processing robot control program that facilitate the teaching operation for laser processing.

In order to achieve the above mentioned object, a laser processing robot control system is provided that basically comprises a robot, a laser beam scanning device, a posture detecting section, a processing spot storing section, a robot controlling section, a scan pattern storing section and a laser beam scan controlling section. The laser beam scanning device is movable in a three-dimensional direction with respect to the robot to scan a laser beam on a workpiece. The posture detecting section is configured to detect a posture of the robot. The processing spot storing section is configured to store information of a processing spot on the workpiece. The robot controlling section is configured to control a movement of the robot to selectively move the laser beam scanning device to a prescribed position from which the laser beam scanning device can irradiate the laser beam at the processing spot. The scan pattern storing section is configured to store information of a scan pattern of the laser beam scanned by the laser beam scanning device. The laser beam scan controlling section is configured to retrieve the information of the scan pattern stored in the scan pattern storing section when the laser beam scanning device is moved to the prescribed position by the robot controlling section, and to control the laser beam scanning device to scan the laser beam at the processing spot in the scan pattern based on the posture of the robot detected by the posture detecting section and the information of the scan pattern retrieved from the scan pattern storing section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 10 is a table showing one example of an area table stored in an inside-area welding data storing section of the laser processing robot control apparatus in accordance with the second embodiment of the present invention;

FIG. 15 is a table showing one example of an area table stored in the inside-area welding data storing section of the laser processing robot control apparatus in accordance with the third embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
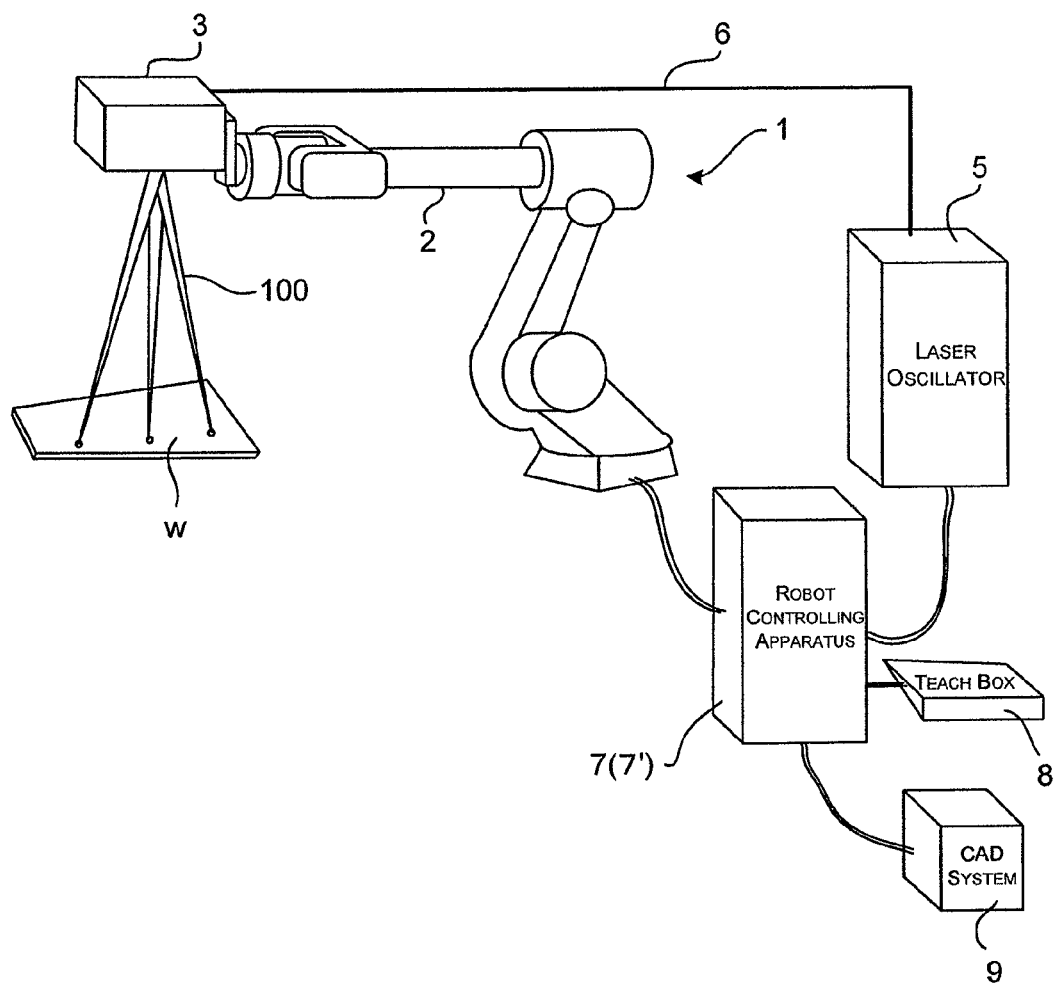
FIG. 1 is a simplified diagrammatic view of a laser welding system in which a laser processing robot control apparatus is applied in accordance with the present invention.
Figure 2:
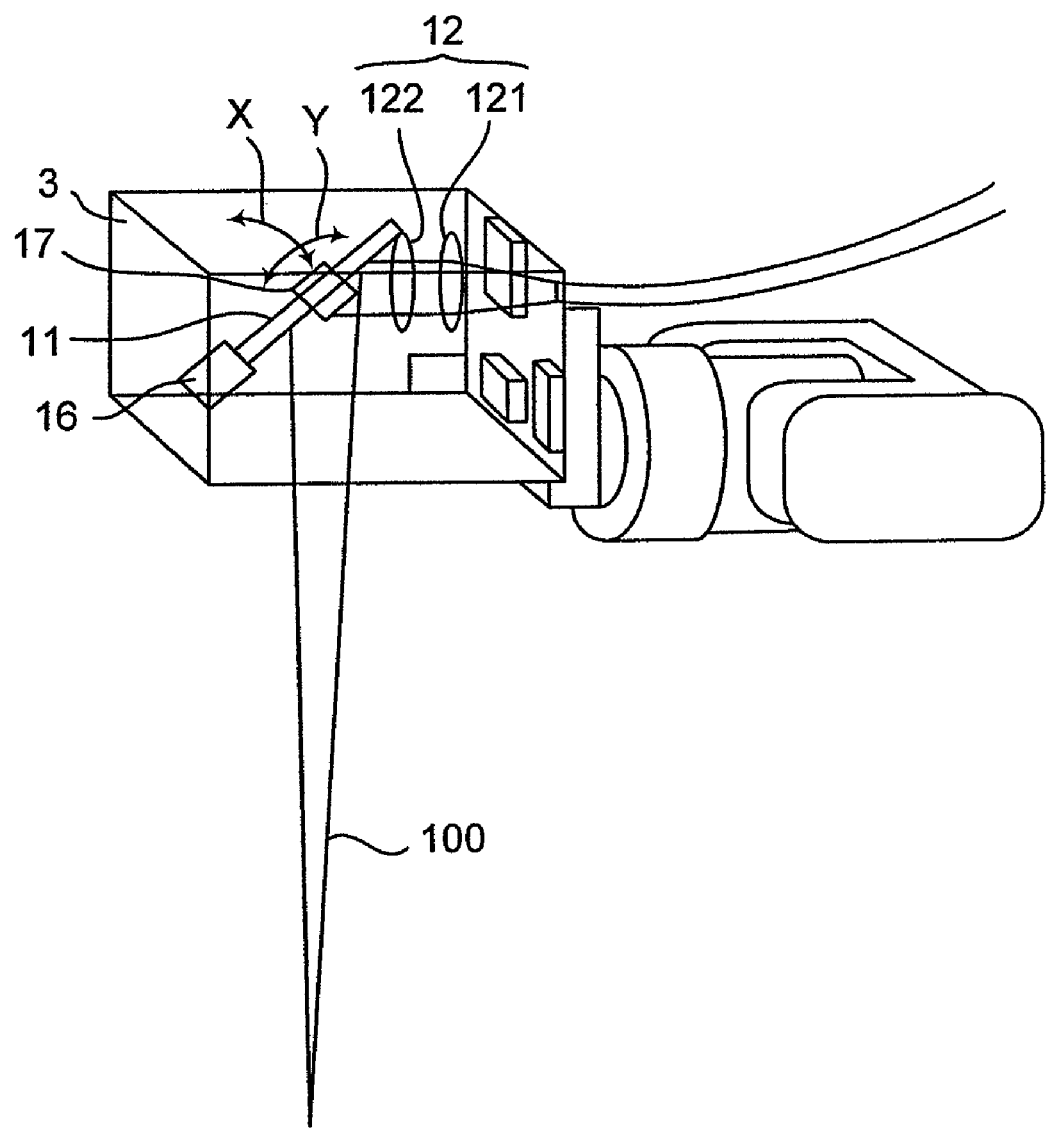
FIG. 2 is a simplified perspective view of a laser beam scanning apparatus of the laser welding system illustrated in FIG. 1 showing internal components of the laser beam scanning apparatus in accordance with the present invention.

Referring initially to FIGS. 1 to 7, a laser processing robot control system in the form of a laser welding system is illustrated in accordance with a first embodiment of the present invention. As seen in FIG. 1, the laser welding system basically includes a robot 1 with a control arm 2, a laser beam scanning device 3, a laser oscillator 5, an optical fiber cable 6, a robot control apparatus 7, a teach box 8 and a CAD (Computer-Aided Design) system 9. The laser processing robot control system performs a laser processing robot control method using a laser processing robot control program to perform laser welding in accordance with the first embodiment of the present invention as explained below. FIG. 1 is a simplified diagrammatic view of the laser welding system to which the present invention is applied. FIG. 2 is a schematic perspective view of the laser beam scanning device 3 used in the laser welding system illustrating internal components of the laser beam scanning device 3. The laser welding system in FIG. 1 performs welding on a welding workpiece W (processing object) wherein the laser beam 100 is irradiated from the laser beam scanning device 3 positioned above the workpiece W without directly touching the workpiece W.

As shown in FIG. 1, the laser welding system includes the robot 1, the laser beam scanning device 3, a laser oscillator 5, an optical fiber cable 6, a robot control apparatus 7, a teach box 8, and a CAD system 9. The laser beam scanning device 3 is installed in an end portion of the arm 2 of the robot 1. The laser beam scanning device 3 is configured and arranged to irradiate the laser beam 100. The laser oscillator 5 is configured and arranged to generate and send the laser beam to the laser beam scanning device 3. The optical fiber cable 6 is configured and arranged to convey or transmit the laser beam from the laser oscillator 5 to the laser beam scanning device 3. The robot control apparatus 7 is configured to control the movement of the robot 1 and the laser beam scanning device 3. The teach box 8 is configured to send various types of instructions to the robot control apparatus 7. The CAD system 9 is configured to send CAD data to the robot control apparatus 7.

The robot 1 is preferably a conventional multiaxial robot with the arm 2 being driven by path data provided by teaching operation to move the laser beam scanning device 3 in various three-dimensional positions and directions. A motor is provided in each axis of the robot 1 so that each axis of the robot 1 can be moved independently by the motor. The laser oscillator 5 is preferably a YAG laser and the laser beam generated by the laser oscillator 5 is conveyed to the laser beam scanning device 3 through the optical fiber cable 6. The laser beam scanning device 3 is configured and arranged to reflect the laser beam inputted by the laser oscillator 5 with a built-in reflective mirror 11, and to scan the powerful laser beam 100 at a process spot (hereinafter referred to as a welding spot) on the workpiece W. The laser beam 100 is irradiated at the welding spot so that welding is performed at the welding spot according to the shape (scan pattern) scanned by the laser beam scanning device 3.

The robot control apparatus 7 is configured to control the movement of the robot 1 while detecting the posture of the robot 1 as well as turning on and off the laser oscillator 5. Also, the robot control apparatus 7 is configured to retrieve the CAD data from the CAD system 9 to determine at which area of the predetermined areas in the workpiece W the laser beam scanning device 3 is going to irradiate the laser beam 100.

The robot control apparatus 7 preferably includes a microcomputer with a laser beam scan control program that controls the robot 1 and the laser beam scanning device 3 as discussed below. The robot control apparatus 7 can also include other conventional components such as an input interface circuit, an output interface circuit, and storage devices such as a ROM (Read Only Memory) device and a RAM (Random Access Memory) device. The microcomputer of the robot control apparatus 7 is programmed to control the robot 1, the laser oscillator 5, and the laser beam scanning device 3. The memory circuit stores processing results and control programs that are run by the processor circuit. The robot control apparatus 7 is operatively coupled to the robot 1, the laser oscillator 5, the laser beam scanning device 3, the CAD system 9 and the teach box 8 in a conventional manner. The internal RAM of the robot control apparatus 7 stores statuses of operational flags and various control data. The internal ROM of the robot control apparatus 7 stores the programs and data for various operations. The robot control apparatus 7 is capable of selectively controlling any of the components of the control system in accordance with the control program. It will be apparent to those skilled in the art from this disclosure that the precise structure and algorithms for the robot control apparatus 7 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The laser beam scanning device 3 is configured and arranged to scan the laser beam on the workpiece W. As illustrated in FIG. 2, the laser beam scanning device 3 includes the reflective mirror 11, a pair of motors 16 and 17 and a lens set 12. The reflective mirror 11 is configured and arranged to irradiate the laser beams 100 conveyed by the optical fiber cable 6 at the welding spot on the workpiece W. The motors 16 and 17 are configured and arranged to turn the reflective mirror 11.

The reflective mirror 11 is independently supported to rotate freely about the X-axis and the Y-axis respectively with a line perpendicular to a main surface of the reflective mirror 11 being set as the Z-axis (both X and Y axes perpendicularly cross the Z-axis). The direction of the reflective mirror 11 is changed to a three-dimensional direction by synthesizing the turning positions of the motors 16 and 17. Therefore, the reflective mirror 11 is installed to selectively irradiate the laser beam 3 conveyed by the optical fiber cable 6 in a three-dimensional direction. A scanning pattern is drawn on the welding spot of the workpiece W by selectively moving or oscillating the reflective mirror 11 in a three-dimensional direction.

The lens set 12 basically includes a collimating lens 121 and a focusing lens 122. The collimating lens 121 is configured and arranged to convert the laser beam radiated from the end portion of the optical fiber cable 6 into the collimated light beam. The focusing lens 122 is configured and arranged to focus the collimated laser beam 100 on the workpiece W. Therefore, the laser beam scanning device 3 needs to maintain a certain distance from the workpiece W so that the distance from the welding spot to the reflective mirror 11 remains in a certain range.

Figure 3:
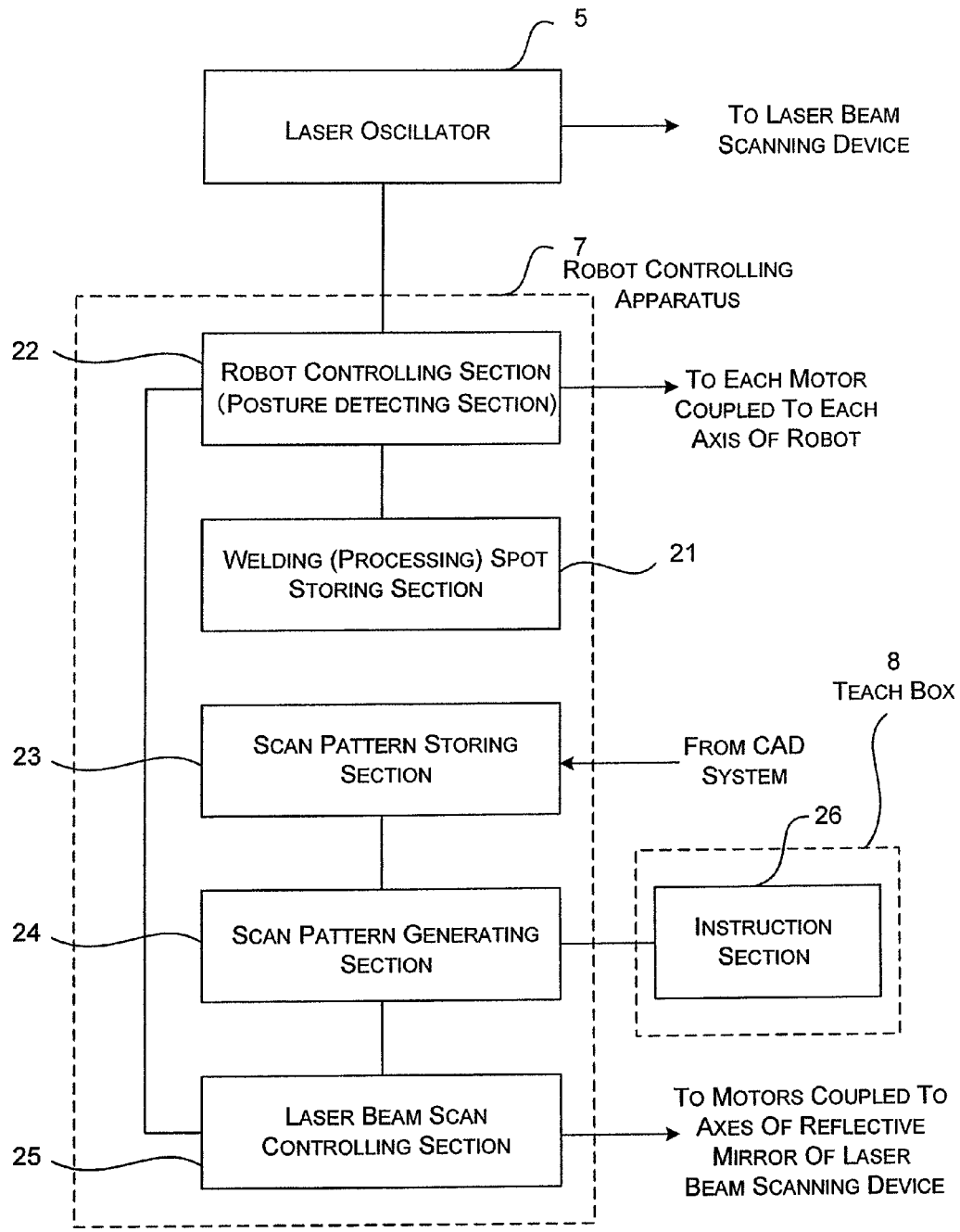
FIG. 3 is a block diagram of a control system of the laser processing robot control apparatus in accordance with a first embodiment of the present invention.

FIG. 3 is a block diagram of a control system of the laser welding system in accordance with the first embodiment of the present invention. As shown in FIG. 3, the robot control apparatus 7 includes a welding (processing) spot storing section 21, a robot controlling section 22, a scan pattern storing section 23, a scan pattern generating section 24 and a laser beam scan controlling section 25.

The welding spot storing section 21 is configured to store information regarding the welding spot on the workpiece W instructed by the teaching operation in advance. The information regarding the welding spot indicates the welding spot on the workpiece W that is represented by a three-dimensional coordinate. Generally, the data of the welding spot on the workpiece W is created by the CAD system 9 (FIG. 1) in advance. Thus, the welding spot storing section 21 is configured to retrieve the welding spot data created by the CAD system 9 and to store the information regarding the welding spot.

The robot controlling section 22 is configured to control a rotation amount of each of the motors provided in the axes of the robot 1 based on the teaching data stored in a memory device (not illustrated) in the robot controlling section 22, thereby controlling the laser beam scanning device 3 to stop in sequence at predetermined positions, for example a predetermined position from which the laser beam can be irradiated at the welding spot disposed on the workpiece W. The robot control apparatus 22 is also configured to detect or recognize the posture of the robot 1 based on the rotation amount (e.g., an output value from an encoder of the motor) of each of the motor provided in the axes of the robot 1. Therefore, the robot controlling section 22 also constitutes a posture detecting section that is configured to detect the posture of the robot 1. The robot controlling section 22 is also configured to determine if the laser beam scanning device 3 is positioned to irradiate the laser beam at a certain welding spot on the workpiece W based on the robot posture detected.

Figure 4:
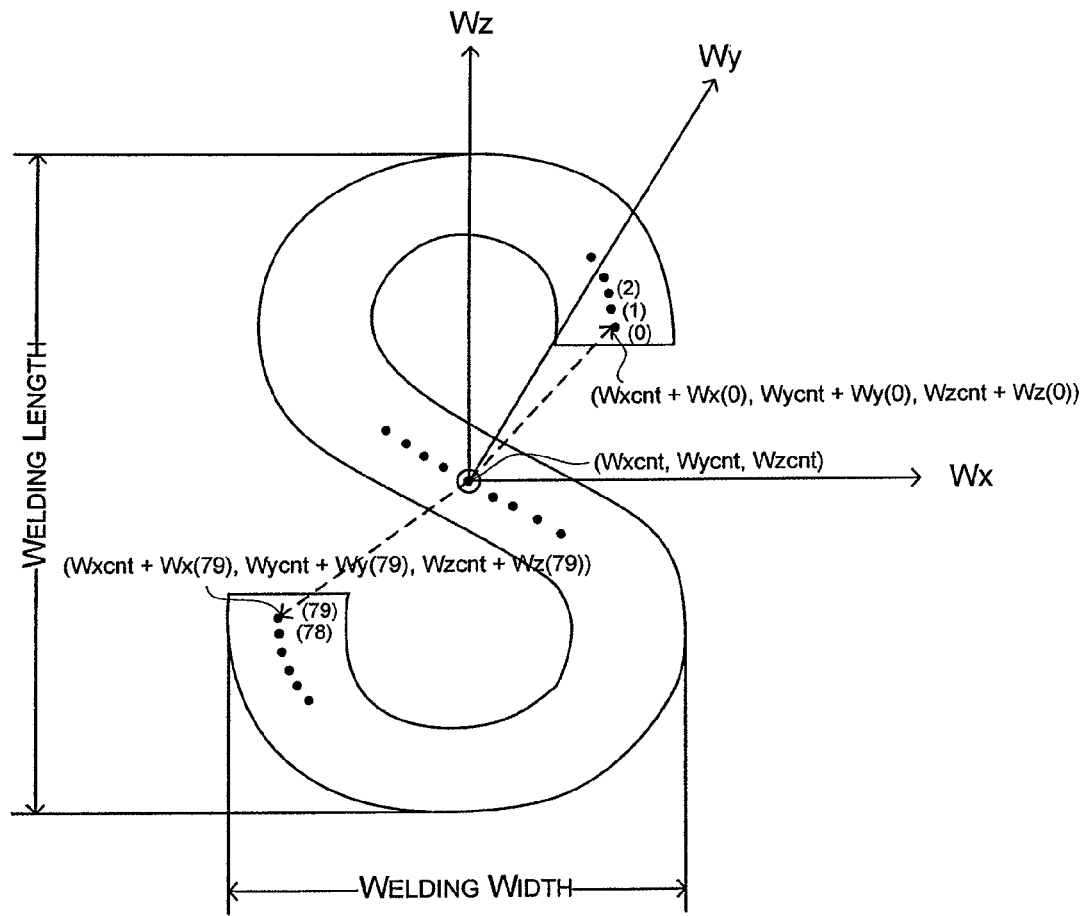
FIG. 4 is a top plan view illustrating a first example of a shape of a laser welding scan pattern in accordance with the present invention.
Figure 5:
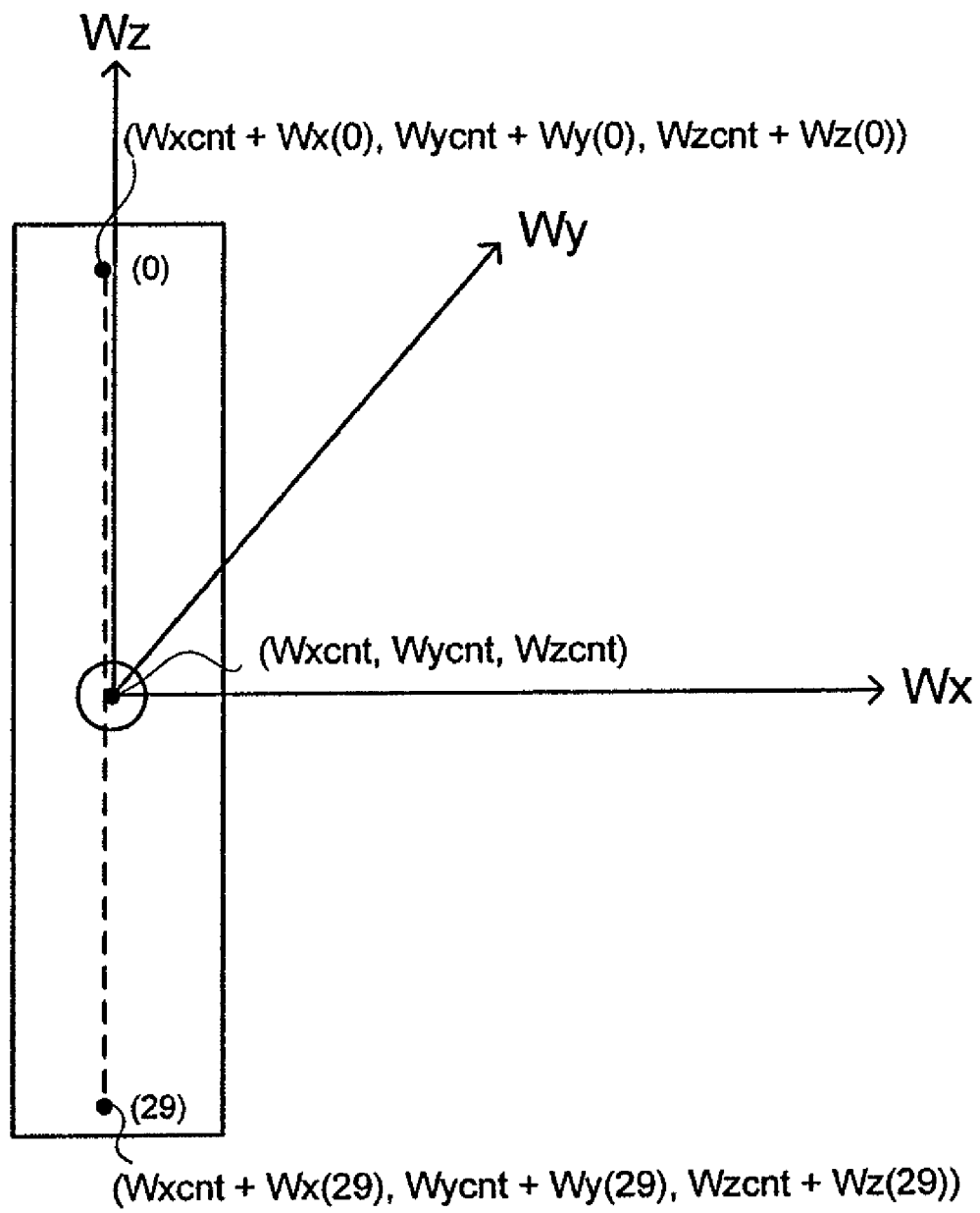
FIG. 5 is a top plan view of a second example of the shape of the laser welding scan pattern in accordance with the present invention.
Figure 6:
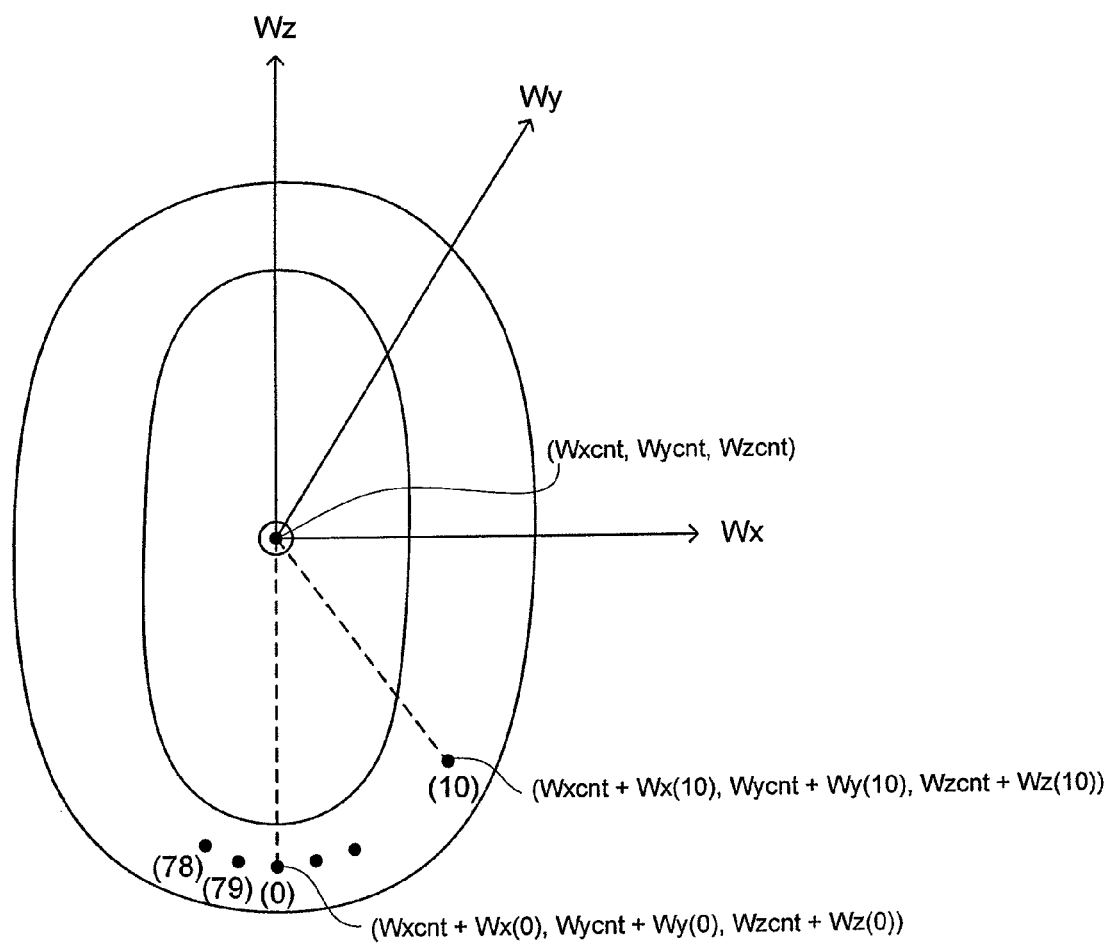
FIG. 6 is a top plan view of a third example of the shape of the laser welding scan pattern in accordance with the present invention.

The scan pattern storing section 23 is preferably a memory device that stores a scan pattern of the laser beam 100 scanned by the laser beam scanning device 3. The scan pattern stored in the scan pattern storing section 23 can be of any size or shape. With the first embodiment, for example, an S-shaped scan pattern is stored as illustrated in FIG. 4. The scan pattern is S-shaped with the size of the S-shape being defined by a welding length and a welding width of the scan pattern shape, such as being a specified number of millimeters in length (welding length) and a specified number of millimeters in width (welding width), for example. Although, in the first embodiment, the scan pattern is described as being S-shaped as shown in FIG. 4, is also acceptable to arrange the scan pattern to be bar-shaped as illustrated in FIG. 5, circular-shaped as illustrated in FIG. 6, or any other shape as needed and/or desired. Since the scan pattern is created by the CAD system 9, the scan pattern storing section 23 is configured to store the data from the CAD system 9.

A method for representing the scan pattern will now be explained. The scan pattern data includes the welding spot center coordinate in the scan pattern and a plurality of dot sequence coordinates each defined as an offset amount from the welding spot center coordinate. The welding spot center coordinate and the dot sequence coordinates are represented in a coordinate system of the workpiece W.

For example, if the scan pattern is S-shaped, the welding length and the welding width of the S-shape are defined as illustrated in FIG. 4. The center of gravity of the S-shape is set as the welding spot center coordinate (Wxcnt, Wycnt, Wzcnt), and the coordinate system (Wx, Wy, Wz) that is the same as the coordinate system of the workpiece W is defined with the welding spot center coordinate (Wxcnt, Wycnt, Wzcnt) being the origin point. Each of the coordinates of, for example, 80-dot sequence from (Wxcnt+Wx(0), Wycnt+Wy(0), Wzcnt+Wz (0)) to (Wxcnt+Wx(79), Wycnt+Wy(79), Wzcnt+Wz(79)) constituting the S-shape is defined as an offset amount from the welding spot center coordinate (e.g., a vector amount represented by a broken line in the drawing). The offset amount represented by the vector indicates how far each point constituting the S-shape is away from the welding spot center coordinate. The offset amount can be defined as a two-dimensional offset amount or a three-dimensional offset amount.

If the scan pattern is bar-shaped as illustrated in FIG. 5, the center of gravity of the bar shape is set to the welding spot center coordinate (Wxcnt, Wycnt, Wzcnt), and the coordinate system (Wx, Wy, Wz) that is the same as the coordinate system of the workpiece W is defined with the welding spot center coordinate (Wxcnt, Wycnt, Wzcnt) being the origin point. Each of the coordinates of, for example, 30-dot sequence from (Wxcnt+Wx(0), Wycnt+Wy(0), Wzcnt+Wz (0)) to (Wxcnt+Wx(29), Wycnt+Wy(29), Wzcnt+Wz(29)) constituting the bar shape are defined as an offset amount from the welding spot center coordinate (e.g., a vector amount represented by a broken line in the drawing).

Moreover, if the scan pattern is circular-shaped as illustrated in FIG. 6, the center of gravity of the circular shape is set as the welding spot center coordinate (Wxcnt, Wycnt, Wzcnt), and the coordinate system (Wx, Wy, Wz) that is the same as the coordinate system of the workpiece W is defined with the welding spot center coordinate (Wxcnt, Wycnt, Wzcnt) being the origin point. Each of the coordinates of, for example, 80-dot sequence from (Wxcnt+Wx(0), Wycnt+Wy (0), Wzcnt+Wz(0)) to (Wxcnt+Wx(79), Wycnt+Wy(79), Wzcnt+Wz(79)) constituting the circular shape is defined as an offset amount from the welding spot center coordinate (e.g., a vector amount represented by a broken line in the drawing).

The scan pattern data stored in the scan pattern storing section 23 is also created by the CAD system 9 (FIG. 1) as well as the welding spot data. The welding spot data and the scan pattern data are individually and independently taught to the robot control apparatus 7 by the CAD system 9. In other words, the welding spot data and the scan pattern data can be treated as completely different data. For this reason, the welding spot storing section 21 and the scan pattern storing section 23 are separately provided in the first embodiment of the present invention.

The scan pattern generating section 24 is configured to generate an S-shaped scan pattern having the same size (dimension) as the S-shaped scan pattern stored in the scan pattern storing section 23, or to generate an S-shaped scan pattern having the size (dimension) as instructed by an instruction section 26 provided in the teach box 8.

The laser beam scan controlling section 25 is configured to input the S-shaped scan pattern having the size (dimension) generated by the scan pattern generating section 24 and to calculate the dot sequence coordinates (e.g., 80-dot sequence) of the S-shape drawn on the welding spot by taking into account the posture of the robot 1 determined by the robot controlling section 22. Then, the laser beam scan controlling section 25 is configured to move the reflective mirror 11 of the laser beam scanning device 3 based on the dot sequence coordinates calculated. The laser beam scan controlling section 25 is also configured to convert the welding spot center coordinate of the scan pattern and the dot sequence coordinates defined as the offset amounts from the welding spot center coordinate, both of which are represented in the coordinate system of the workpiece W, into coordinates in the coordinate system of the robot 1.

The instruction section 26 is configured to output instructions on the size of the scan pattern drawn on the welding spot on the workpiece W based on, for example, the welding strength required of the welding spot. For example, the instruction section 26 is configured to output instructions such as the length of the S-shape in the scan pattern to be three times and the width to be 1.5 times as long as the S-shape stored in the welding spot storing section 21. With the first embodiment, the instruction regarding the size of the scan pattern is performed by the instruction section 26. However, it is also acceptable to incorporate the instruction output operation in a program for laser welding that is loaded or read in.

Figure 7:
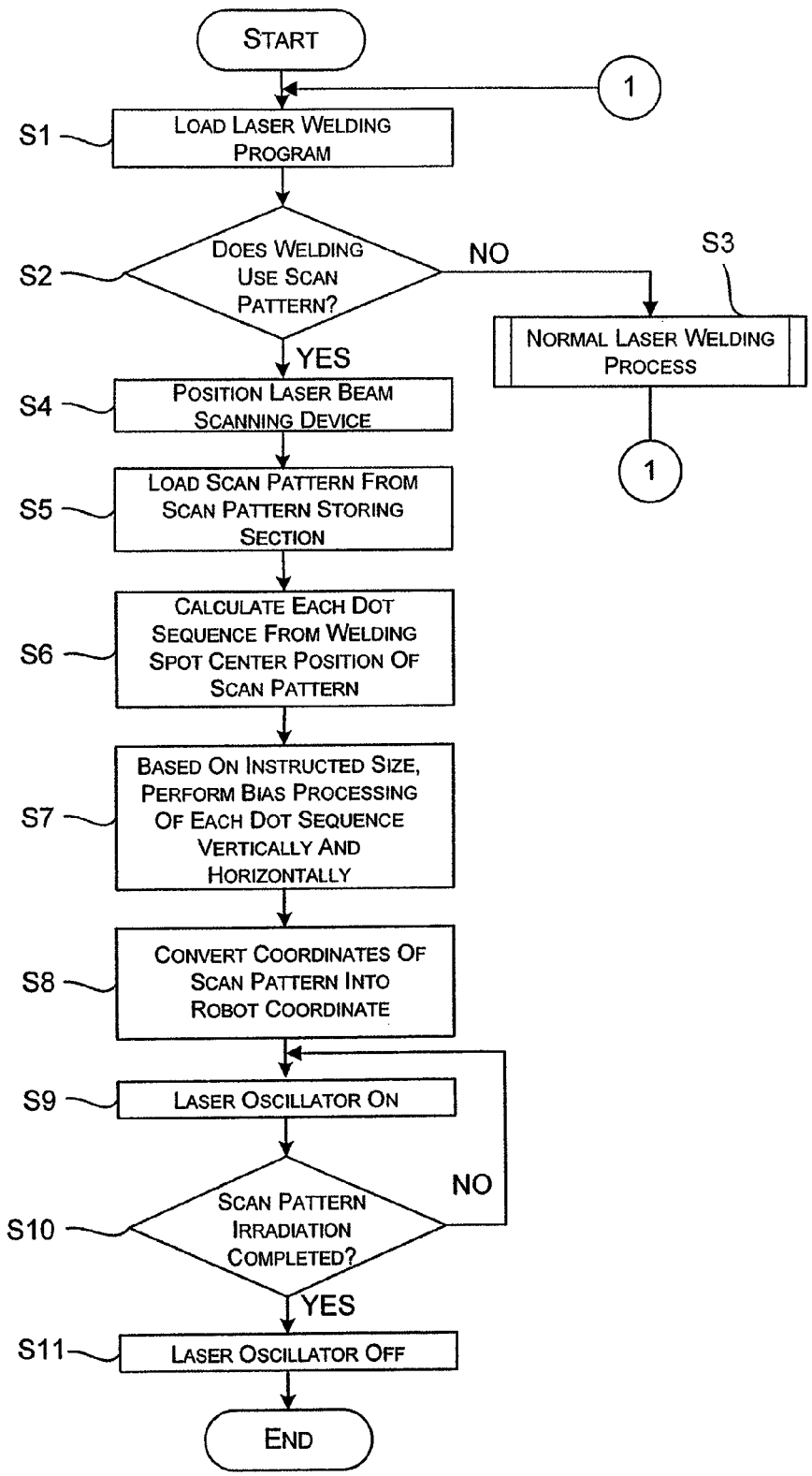
FIG. 7 is a flowchart illustrating a control processing executed by the laser processing robot control apparatus in accordance with the first embodiment of the present invention.

Referring now to FIG. 7, the operation of the laser processing robot control apparatus in accordance with the first embodiment of the present invention will be explained in detail. The flowchart of FIG. 7 illustrates an overall procedure for laser welding using the laser processing robot control apparatus of the first embodiment of the present invention. With the first embodiment, the robot 1 is stopped at an instructed position at which the laser beam scanning device 3 performs laser welding on a welding spot disposed on the workpiece W. If laser welding needs to be performed on the next welding spot, the robot 1 moves to the next position. Thus, laser welding is performed at each position by repeating the movement of the robot 1 in sequence until laser welding is completed at all the welding spots on the workpiece W.

In step S1, the robot controlling section 22 is configured to load the program for laser welding. More specifically, in the first embodiment of the present invention, the program for laser welding has a structure of [n: MOVE (robot stop position, movement speed, welding spot center coordinate, scan pattern, welding width, welding length)].

In step S2, the robot controlling section 22 is configured to determine whether or not to perform welding by using the scan pattern stored in the scan pattern storing section 23. The determination in step S2 is based on whether the program for laser welding includes the description of the scan pattern. If the program for laser welding does not include the description of the scan pattern (No in step S2), the instruction for welding using the scan pattern is not outputted. Thus, in such case, the robot controlling section 22 is configured to prepare to perform a normal or conventional laser welding work in step S3. Since the preparation for the normal laser welding work is not directly related to the present invention and can be performed using any conventional welding technique, a detailed explanation thereof will be omitted.

On the other hand, if the robot controlling section 22 determines to perform welding by using the scan pattern (Yes in step S2), in step S4, then the robot controlling section 22 is configured to move the tip portion of the arm 2 of the robot 1, i.e., move the position of the laser beam scanning device 3, by a MOVE instruction at a movement speed described in the program to position the robot 1 at a robot stop position. Simultaneously, in step S4, the robot controlling section 22 is configured to position the reflective mirror 11 of the laser beam scanning device 3 toward the welding spot on the workpiece W. More specifically, the direction of the reflective mirror 11 is adjusted so that the laser beam inputted from the laser oscillator 5 is irradiated at the welding spot center coordinate of the predetermined welding spot. The laser beam scanning device 3 can irradiate the laser beam at the predetermined welding spot from this position.

In step S5, the scan pattern generating section 24 is configured to load the scan pattern from the scan pattern storing section 23. With the first embodiment, for example, the S-shaped scan pattern illustrated in FIG. 4 is loaded.

In step S6, the scan pattern generating section 24 is configured to calculate each coordinate of the 80 dots in the scan pattern from the welding spot center coordinate, the welding width, and the welding length that are represented in the coordinate system of the workpiece W and loaded (and stored in the scan pattern storing section 23) so as to generate the scan pattern on the welding spot of the workpiece W.

In step S7, the calculated coordinates of the 80 dots are shifted to the vertical (welding length) direction and the horizontal (welding width) directions based on the welding width and the welding length described in the loaded program, thereby performing a bias processing to generate an actual size scan pattern having the required size for the welding spot.

In step S8, the laser beam scan controlling section 25 is configured to convert the coordinates of the 80 dots in the scan pattern generated from the coordinate system of the workpiece W into the coordinate system of the robot 1. Also, the laser beam scan controlling section 25 is configured to simultaneously input the posture of the robot 1 determined by the robot controlling section 22 and to calculate a target movement of the reflective mirror 11 (angles of the reflective mirror 11 at various time points from the commencement to the end of the movement of the reflective mirror 11) in order to draw the actual size scan pattern of the required size on the welding spot on the targeted workpiece W with the current posture of the robot 1.

When the calculation in step S8 is completed, in step S9, the robot control apparatus 7 is configured to issue an activating instruction to the laser oscillator 5 to turn on the laser oscillator 5. When the laser oscillator 5 is turned on, the laser beam is irradiated at the reflective mirror 11, which moves as calculated.

In step S10, the laser beam scan controlling section 25 is configured to determine whether or not the reflective mirror 11 completed the movement (i.e., whether or not laser irradiation of the scan pattern is finished). If the movement of the reflective mirror 11 has not been completed (No in step S10), the laser welding continues (steps S9 and S10 are repeated) with the laser oscillator 5 being turned on. When the movement of the reflective mirror 11 is completed (Yes in step S10), in step S11, the laser oscillator 5 is turned off to finish the laser welding process.

Through the laser welding process described above, irradiation of the scan pattern at one welding spot is completed. With this example, the S-shape was illustrated as the scan pattern. It is also acceptable for the scan pattern storing section 23 to store the bar-shaped scan pattern (FIG. 5), the circular-shaped scan pattern (FIG. 6) and any other shaped scan pattern as needed and/or desired so that the appropriate scan pattern can be selected depending on the type of the workpiece. It is also acceptable to select the shape of the scan pattern for each welding spot on the workpiece.

As described above, with the laser processing robot control apparatus in accordance with the first embodiment of the present invention, the scan pattern data is stored separately from the teaching data for the movement of the robot 1. Once the robot 1 is positioned according to the teaching data, laser welding is performed based on the scan pattern data (with this example, the 80 points constitute the S-shaped scan pattern for the welding spot), which does not require the teaching of the scan pattern for the robot 1 as in the conventional method. Therefore, the teaching time for performing laser welding is greatly reduced. Moreover, when the shape of the scan pattern needs to be changed, only the data stored in the scan pattern storing section 23 needs to be changed, thereby simplifying a method of changing the shape of the scan pattern.

The laser processing robot control apparatus in accordance with the first embodiment of the present invention can also be arranged as a computer. In such case, the computer program used in the computer includes instructions for detecting a posture of the laser processing robot (the robot controlling section 22), storing information of a processing spot on the workpiece (the welding spot storing section 21), controlling a movement of the laser processing robot to selectively move the laser beam scanning device to a prescribed position from which the laser beam scanning device can irradiate the laser beam at the processing spot (the robot controlling section 22), a scan pattern storing section configured to store information of a scan pattern of the laser beam scanned by the laser beam scanning device (the scan pattern storing section 23), retrieving the information of the scan pattern stored in the scan pattern storing section when the laser beam scanning device is moved to the prescribed position, and controlling the laser beam scanning device to irradiate the laser beam at the processing spot in the scan pattern based on the posture of the robot and the information of the scan pattern (the laser beam scan controlling section 25).

Accordingly, with the laser processing robot control apparatus and method of the first embodiment of the present invention, the teaching operation for moving the robot 1 (i.e., moving the laser beam scanning device 3 coupled to the arm 2 of the robot 1) to the prescribed stop position is performed independently of the teaching operation for moving the reflective mirror 11 in accordance with the scan pattern. In other words, in the present invention, the program for moving the reflective mirror 11 according to the scan pattern is read in (step S5) after the program for moving the robot 1 is executed and the robot 1 is moved to the prescribed stop position (step S4). Therefore, comparing to the conventional robot control program that performs the teaching operation for moving the robot and the teaching operation for moving the reflective mirror in one sequence (i.e., the instructions for moving the robot and for moving the reflective mirror are programmed in series), the teaching time for performing laser welding is greatly reduced in the present invention. Moreover, when the shape of the scan pattern needs to be changed, only the data stored in the scan pattern storing section 23 needs to be changed, thereby simplifying a method of changing the shape of the scan pattern.

Second Embodiment

Referring now to FIGS. 8 to 13, a laser processing robot control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The laser processing robot control apparatus of the second embodiment differs from the laser processing robot control apparatus of the first embodiment in that, in the second embodiment, the scan pattern is irradiated in sequence at a plurality of welding spots disposed in a prescribed area with a position of the laser beam scanning device 3 being fixed, while in the first embodiment only one scan pattern is irradiated at one welding spot with the position of the laser beam scanning device 3 being fixed.

Since the configuration of the laser welding system to which the second embodiment is applied is identical to those illustrated in FIGS. 1 and 2, except that a robot control apparatus 7' of the second embodiment is configured differently from the robot control apparatus 7' of the first embodiment, a detailed explanation of the configuration thereof will be omitted.

Figure 8:
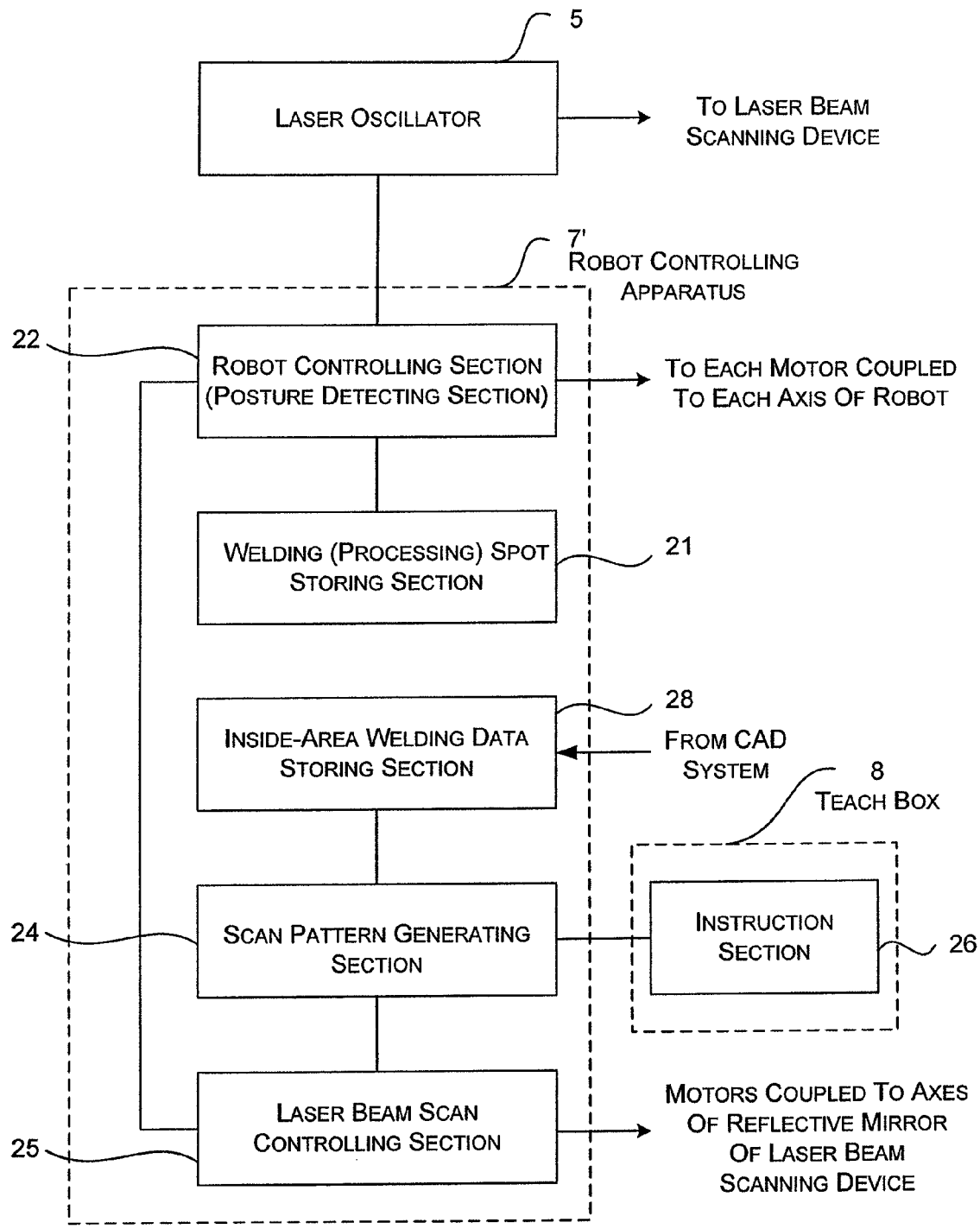
FIG. 8 is a block diagram of a control system of a laser processing robot control apparatus in accordance with second and third embodiments of the present invention.

FIG. 8 is a block diagram of a control system of the laser processing robot control apparatus in accordance with the second embodiment of the present invention. As seen in FIG. 7, the robot control apparatus 7' has a configuration identical to the robot control apparatus 7 of the first embodiment illustrated in FIG. 3, except that an inside-area welding data storing section 28 is provided instead of the scan pattern storing section 23 of the first embodiment. Below, the configuration of the robot control apparatus 7' in accordance with the second embodiment will be explained.

The robot control apparatus 7' includes with the welding spot storing section 21, the robot controlling section 22, the scan pattern generating section 24, the laser beam scan controlling section 25, and the inside-area welding data storing section 28.

The welding spot storing section 21 is configured to store information regarding the welding spot on the workpiece W instructed by the teaching operation in advance. The information regarding the welding spot indicates the welding spot on the workpiece W that is represented by a three-dimensional coordinate. Generally, the data of the welding spot on the workpiece W is created by the CAD system 9 (FIG. 1) in advance. Thus, the welding spot storing section 21 is configured to retrieve the welding spot data created by the CAD system 9 and to store the information regarding the welding spot.

The robot controlling section 22 is configured to control a rotation amount of each of the motors provided in the axes of the robot 1 based on the teaching data stored in a memory (not illustrated) in the robot controlling section 22, thereby controlling the laser beam scanning device 3 to stop in sequence at predetermined positions, for example a predetermined position in the welding spot set on the workpiece W. The robot control apparatus 22 is also configured to detect or recognize the posture of the robot 1 based on the rotation amount (e.g., an output value from an encoder of the motor) of each of the motor provided in the axes of the robot 1. Therefore, the robot controlling section 22 also constitutes a posture detecting section configured to detect the posture of the robot 1. The robot controlling section 22 is also configured to determine if the laser beam scanning device 3 is positioned to irradiate the laser beam at a certain welding spot on the workpiece W based on the robot posture detected.

Figure 9:
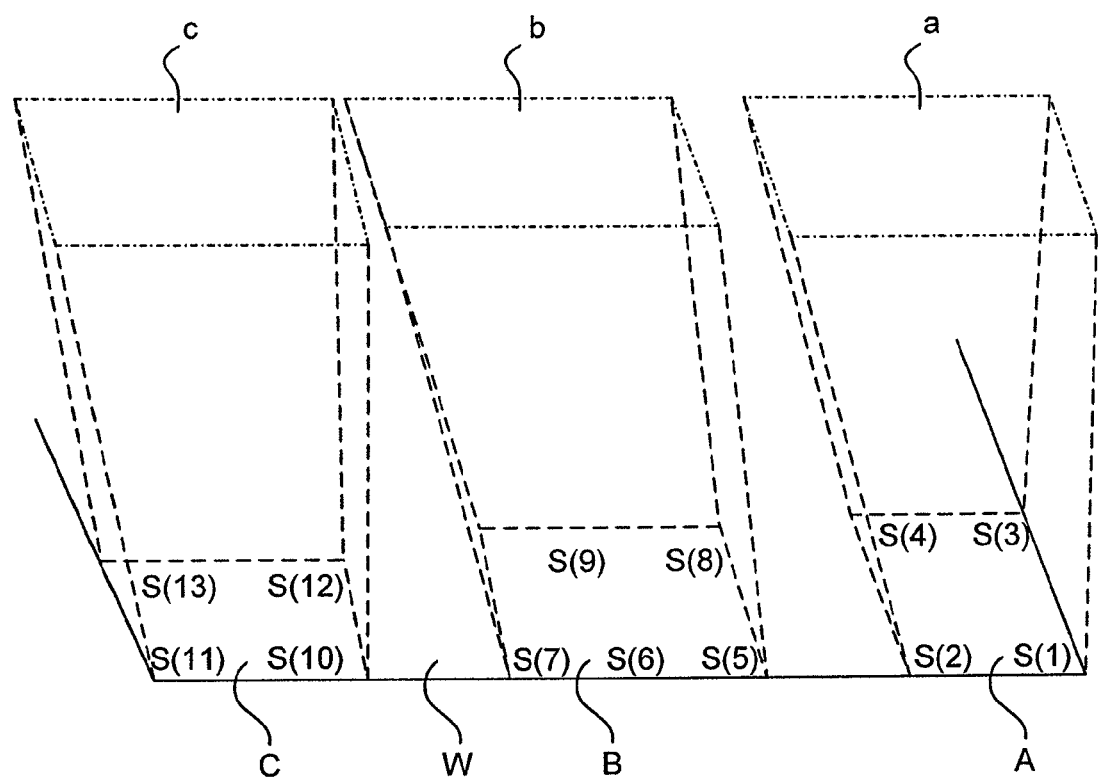
FIG. 9 is a schematic perspective view explaining grouping of a plurality of welding spots in a plurality of prescribed areas on a workpiece in accordance with the second embodiment of the present invention.

As illustrated in FIG. 9, the inside-area welding data storing section 28 is preferably arranged as a memory device that stores positions of a plurality of welding spots S(1) to S(4) in a prescribed area A, a plurality of welding spots S(5) to S(9) in a prescribed area B, a plurality of welding spots S(10) to S(13) in a prescribed area C disposed in the workpiece W, as well as positions of prescribed areas a, b and c disposed in a movement path of the laser beam scanning device 3. Also, the inside-area welding data storing section 28 is configured to store the scan pattern of the laser beam 100 scanned at the welding spots S(1) to S(13) by the laser beam scanning device 3. Thus, the inside-area welding data storing section 28 constitutes the scan pattern storing section of the present invention in the second embodiment.

The welding spots S(1) to S(13) on the workpiece W are set by the CAD system 9 and each of the welding points S(1) to S(13) is grouped and assigned to one of the areas A, B and C corresponding to the areas a, b and c, respectively. As illustrated in FIG. 9, for example, the welding spots S(1) to S(4) are grouped together and assigned to the area A, the welding spots S(5) to S(9) are grouped together and assigned to the area B, and the welding spots S(10) to S(13) are grouped together and assigned to the area C. On the movement path of the laser beam scanning device 3, a region in which the welding spots S(1) to S(4) can be scanned with the laser beam scanning device 3 being fixed at a position within the region is set as the area a. Likewise, a region on the movement path of the laser beam scanning device 3 in which the welding spots S(5) to S(9) can be scanned with the laser beam scanning device 3 being fixed at a position within the region is set as the area b. Finally, a region on the movement path of the laser beam scanning device 3 in which the welding spots S(10) to S(13) can be scanned with the laser beam scanning device 3 being fixed at a position within the region is set as the area c. Each of the welding points S(1) to S(13) is grouped in the CAD system 9 (FIG. 1). Also, the areas a, b and c are set by the CAD system 9 (FIG. 1). The information obtained from the CAD system 9 is stored in the inside-area welding data storing section 28 as an area table (area information) such as one illustrated in FIG. 10. The area table is preferably created for each of the areas a, b and c.

The scan pattern stored in the inside-area welding data storing section 28 can be of any size or shape. With the second embodiment, for example, an S-shaped scan pattern is stored as illustrated in FIG. 4. The scan pattern is S-shaped and the size of the S-shape is defined by a welding length and a welding width of the scan pattern shape, such as being a specified number of millimeters in length (welding length) and a specified number of millimeters in width (welding width), for example. Although, in the second embodiment, the scan pattern is described as being S-shaped as shown in FIG. 4, it is also acceptable to arrange the scan pattern to be bar-shaped as illustrated in FIG. 5, circular-shaped as illustrated in FIG. 6, or any other shape as needed and/or desired. The scan pattern data includes the welding spot center coordinate set in the scan pattern and a plurality of dot sequence coordinates each defined as an offset amount from the welding spot center coordinate. The welding spot center coordinate and the dot sequence coordinates are represented in a coordinate system of the workpiece W.

The scan pattern data stored in the inside-area welding data storing section 28 is also created by the CAD system 9 (FIG. 1) as well as the welding spot data. The welding spot data and the scan pattern data are individually and independently taught to the robot control apparatus 7' by the CAD system 9. In other words, the welding spot data and the scan pattern data can be treated as completely different data. For this reason, the welding spot storing section 21 and the inside-area welding data storing section 28 are separately provided in the second embodiment of the present invention.

The scan pattern generating section 24 is configured to generate an S-shaped scan pattern having the same size (dimension) as the one stored in the inside-area welding data storing section 28, or the S-shaped scan pattern having the size instructed by the instruction section 26 provided in the teach box 8.

The laser beam scan controlling section 25 is configured to input the S-shaped scan pattern of the size generated by the scan pattern generating section 24 when the laser beam scanning device 3 is positioned in one of the areas a, b and c in which the laser beam can be irradiated at corresponding one of the groups of the welding spots S(1) to S(4) in the area A, the welding spots S(5) to S(9) in the area B, and the welding spots S(10) to S(13) in the area C disposed on the workpiece W. The laser beam scan controlling section 25 is further configured to calculate the dot sequence coordinates (e.g., 80-dot sequence) of the S-shape drawn on the welding spots S(1) to S(13) on the areas A, B and C by taking into account the posture of the robot 1 determined by the robot controlling section 22. Then, the laser beam scan controlling section 25 is configured to move the reflective mirror 11 of the laser beam scanning device 3 based on the dot sequence coordinates calculated. The laser beam scan controlling section 25 is also configured to convert the welding spot center coordinate of the scan pattern and the dot sequence coordinates defined as the offset amounts from the welding spot center coordinate, both of which are represented in the coordinate system of the workpiece W, into the coordinates in the coordinate system of the robot 1.

The instruction section 26 is configured to output instructions on the size of the scan pattern drawn on the welding spot on the workpiece W based on, for example, the welding strength required of the welding spot. For example, the instruction section 26 is configured to output instructions such as the length of the S-shape in the scan pattern to be three times and the width to be 1.5 times as long as the S-shape stored in the welding spot storing section 21. With the second embodiment, the instruction regarding the size of the scan pattern is performed by the instruction section 26. However, it is also acceptable to incorporate the instruction output operation in a program for laser welding that is loaded or read in.

Figure 11:
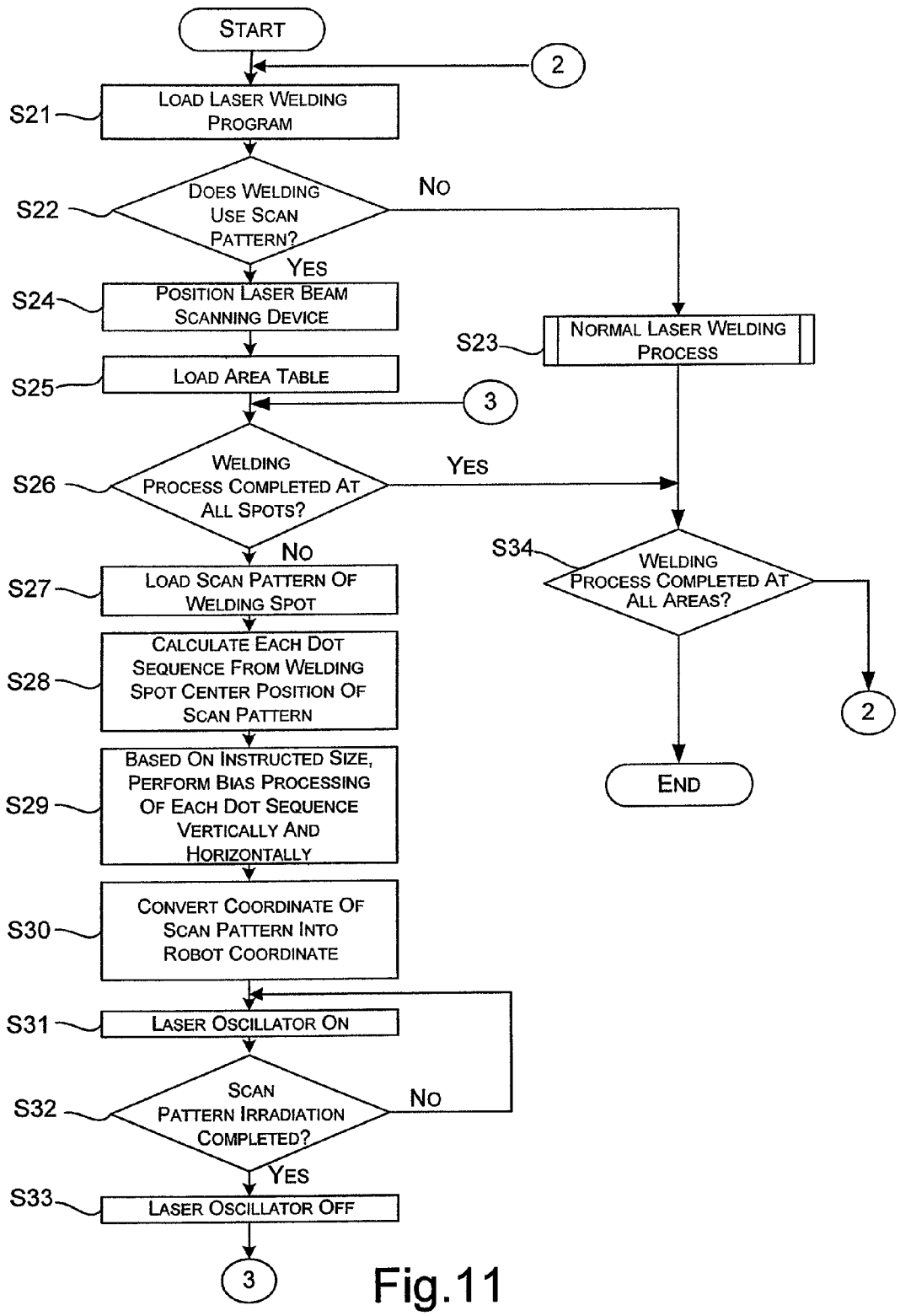
FIG. 11 is a flowchart illustrating a control processing executed by the laser processing robot control apparatus in accordance with the second embodiment of the present invention.

Referring now to FIG. 11, the operation of the laser processing robot control apparatus in accordance with the second embodiment of the present invention will be explained in detail. The flowchart of FIG. 11 illustrates an overall procedure for laser welding using the laser processing robot control apparatus of the second embodiment of the present invention. In the second embodiment, when the laser beam scanning device 3 is detected to enter one of the prescribed areas a, b and c set in advance while the robot 1 is moving along the movement path described in the teaching data, the laser beam scanning device 3 is stopped and the laser welding starts at corresponding ones of the welding spots S(1) to S(13) (grouped in advance) that can be irradiated in sequence from the position of the laser beam scanning device 3. When the laser welding is finished at all the welding spots in one of the areas a, b and c, the laser beam scanning device 3 is moved to the next one of the areas a, b and c to perform laser welding at all the welding spots within that area. By repeating this movement, the laser beam scanning device 3 is moved to each of the areas a, b and c, thereby completing the laser welding at all the welding spots S(1) to S(13).

In step S21, the robot controlling section 22 is configured to load the program for laser welding. More specifically, in the second embodiment of the present invention, the program for laser welding has a structure of [n: MOVE (robot stop position, movement speed, area table number)].

In step S22, the robot controlling section 22 is configured to determine whether or not to perform welding by using the scan pattern stored in the scan pattern storing section 23. The determination in step S22 is based on whether the program for laser welding includes the description of the area table number. If the program for laser welding does not include the description of the area table number (No in step S22), the instruction for welding using the scan pattern is not outputted. Thus, in such case, the robot controlling section 22 is configured to prepare to perform a normal or conventional laser welding work in step S23. Since the preparation for the normal laser welding work is not directly related to the present invention and can be performed using any conventional welding technique, a detailed explanation thereof will be omitted.

On the other hand, if the robot controlling section 22 determines to perform welding by using the scan pattern (Yes in step S22), in step S24, the robot controlling section 22 is configured to move the tip portion of the arm 2 of the robot 1, i.e., move the position of the laser beam scanning device 3, by a MOVE instruction at a movement speed described in the program to position the robot 1 at a robot stop position disposed within the area a. Simultaneously, in step S24, the robot controlling section 22 is configured to position the reflective mirror 11 of the laser beam scanning device 3 toward the welding spot on the workpiece W. More specifically, the direction of the reflective mirror 11 is adjusted so that the laser beam inputted from the laser oscillator is irradiated at the welding spot center coordinate of one of the welding spots S(1) to S(4). The laser beam scanning device 3 can irradiate the laser beam at all the welding spots S(1) to S(4) disposed in the area A of the workpiece W from this position.

Figure 12:
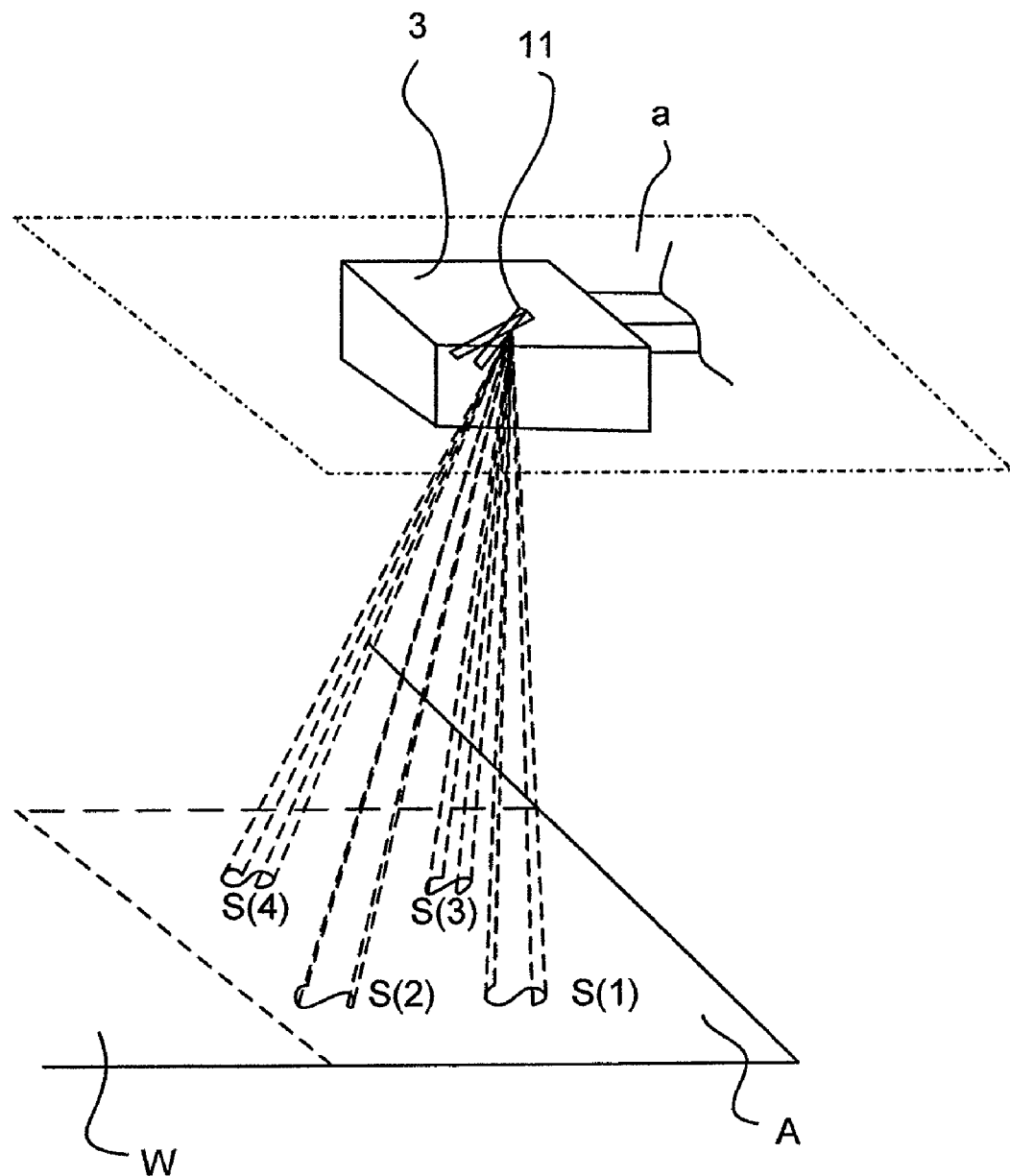
FIG. 12 is a schematic perspective view of the laser beam scanning device for explaining a movement of a reflective mirror of the laser beam scanning device in accordance with the second embodiment of the present invention.

In step S25, the scan pattern generating section 24 is configured to load the area table arranged as shown in FIG. 10 that is stored in the inside-area welding data storing section 28. In this example, since the laser beam scanning device 3 is stopped inside the area a, the area table created for the area a is loaded. The area table created for the area a contains information describing the scan pattern of four welding spots (the welding spots S(1) to S(4)) as illustrated in FIG. 9. In the process below, as illustrated in FIG. 12, the scan patterns are drawn on the welding spots S(1) to S(4) grouped in the area A in this sequence while the position of the laser beam scanning device 3 is fixed at the position in the area a.

In step S26, the robot controlling section 22 is configured to determine whether or not the welding process is finished at all the welding spots that can be irradiated when the laser beam scanning device 3 is fixed at the position disposed in the area a (i.e., the welding spots S(1) to S(4) disposed in the area A on the workpiece W). If the welding process is finished at all the welding spots from the area a (Yes in step S26), the laser beam scanning device 3 is moved to the next area b to start laser welding of the next group of welding spots S(5) to S(9) as shown in FIG. 9. In particular, the welding process proceeds to step S34, where the robot controlling section 22 is configured to determine whether the welding process is finished at all the welding spots S(1) to S(13). If the welding process is finished at all the welding spots S(1) to S(13) as shown in FIG. 9 (Yes in step S34), then the welding process is ended. If the welding process is not finished at all the welding spots S(1) to S(13) as shown in FIG. 9 (No in step S34), then the processing returns to step S21 to start the welding process in the next area.

On the other hand, if the welding process has not finished at all the welding spots in the area a (No in step S26), in step S27 the scan pattern generating section 24 is configured to load the scan pattern of the welding spots S(1) to S(4) from the area table illustrated in FIG. 10. With the second embodiment, the S-shaped scan pattern illustrated in FIG. 4 is loaded.

In step S28, the scan pattern generating section 24 is configured to calculate each coordinate of the 80 dots in the scan pattern based on the welding width, the welding length, the coordinates x, y, and z that are described using the coordinate system of the workpiece W to draw the scan pattern at each of the welding spots S(1) to S(4).

In step S29, the calculated coordinates of the 80 dots for each of the welding spots S(1) to S(4) are shifted to the vertical (welding length) direction and the horizontal (welding width) directions based on the welding width and the welding length described in the loaded program, thereby performing a bias processing to generate a scan pattern of the required size.

In step S30, the laser beam scan controlling section 25 is configured to convert the coordinates of the 80 dots for each of the welding spots S(1) to S(4) in the scan pattern generated from the coordinate system of the workpiece W into the coordinate system of the robot 1. Also, the laser beam scan controlling section 25 is configured to simultaneously input the posture of the robot 1 determined by the robot controlling section 22 and to calculate a target movement of the reflective mirror 11 (angles of the reflective mirror 11 at various time points from the commencement to the end of the movement of the reflective mirror 11) in order to draw the scan pattern of the size required on the welding spot on the targeted workpiece W with the current posture of the robot 1.

When the calculation in step S30 is completed, in step S31, the robot control apparatus 7' is configured to issue an activating instruction to the laser oscillator 5 to turn on the laser oscillator 5. When the laser oscillator 5 is turned on, the laser beam is irradiated at the reflective mirror 11, which moves as calculated.

In step S33, the laser beam scan controlling section 25 is configured to determine whether or not the movement of the reflective mirror 11 is completed (i.e., whether the irradiation of the scan pattern is completed). In other words, the laser beam scan controlling section 25 is configured to determine whether or not the scanning is finished for one of the welding spots S(1) to S(4). If the movement of the reflective mirror 11 has not been completed (No in step S32), the laser welding of one of the welding spots S(1) to S(4) continues with the laser oscillator 5 being turned on (steps S31 and S32 are repeated). When the movement of the reflective mirror 11 has been completed (Yes in step S32), the laser oscillator 5 is turned off to finish the laser welding in step S33 and then proceed back to step S21. The laser oscillator 5 is turned on and off each time scanning is performed at one of the welding spots S(1) to S(4). Through the process described above, the scan pattern is irradiated at the welding spots S(1) to S(4) in sequence as illustrated in FIG. 12, thereby finishing the welding at all the welding spots S(1) to S(4) disposed in the area A.

Figure 13:
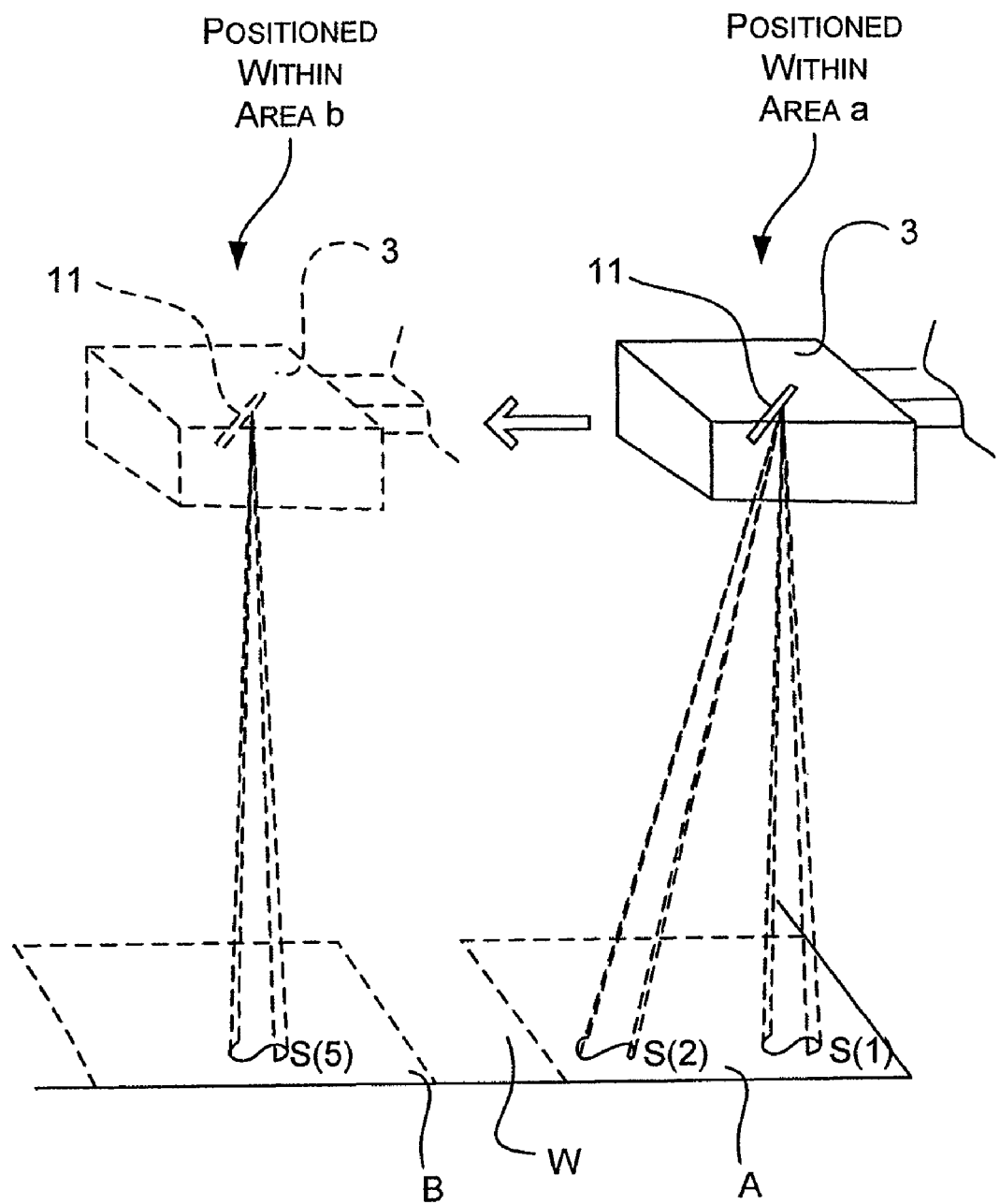
FIG. 13 is a schematic perspective view of the laser beam scanning device for explaining a movement of the laser beam scanning device in accordance with the second embodiment of the present invention.

As described above, welding is finished at the welding spots S(1) to S(4) disposed in the area A. Then, the laser beam scanning device 3 is moved to a position within the area b as illustrated in FIGS. 10 and 13, wherein the same processing described in steps S21 to S33 as above is executed to perform laser welding at the welding spots S(5) to S(9) disposed in the area B in sequence. Moreover, after the welding of the welding spots S(5) to S(9) in the area B is completed, the laser beam scanning device 3 is moved to a position within the area c, wherein the same processing described in steps S21 to S33 as above is executed to perform laser welding at the welding spots S(10) to S(13) disposed in the area C in sequence, thereby finishing welding at all the welding spots S(1) to S(13) disposed on the workpiece W.

With this example, the S-shape was illustrated as the scan pattern. It is also acceptable for the inside-area welding data storing section 28 to store the bar-shaped (FIG. 5) and the circular-shaped (FIG. 6) scan pattern and any other shape as needed and/or desired so that the appropriate scan pattern can be selected depending on the type of the workpiece. It is also acceptable to select the shape of the scan pattern for each welding spot on the workpiece.

As described above, with the laser processing robot control apparatus in accordance with the second embodiment of the present invention, the scan pattern data is stored separately from the teaching data for the movement of the robot as part of the area table. Once the robot 1 is positioned according to the teaching data, laser welding is performed based on the scan pattern data, which, similarly to the first embodiment, does not require the teaching of the scan pattern for the robot 1 as in the conventional method. Therefore, the teaching time for performing laser welding is greatly reduced. Moreover, when the shape of the scan pattern needs to be changed, only the corresponding area table data stored in the inside-area welding data storing section 28 needs to be changed by the CAD system 9, thereby simplifying a method of changing the shape of the scan pattern. The laser processing robot control apparatus in accordance with the second embodiment of the present invention can also be arranged as a computer. In such case, the computer program used in the computer includes instructions for detecting a posture of the laser processing robot (the robot controlling section 22), storing information of a processing spot on the workpiece (the welding spot storing section 21), controlling a movement of the laser processing robot to selectively move the laser beam scanning device to a prescribed position from which the laser beam scanning device can irradiate the laser beam at the processing spot (the robot controlling section 22), a scan pattern storing section configured to store information of a scan pattern of the laser beam scanned by the laser beam scanning device (the inside-area welding data storing section 28), retrieving the information of the scan pattern stored in the scan pattern storing section when the laser beam scanning device is moved to the prescribed position, and controlling the laser beam scanning device to irradiate the laser beam at the processing spot in the scan pattern based on the posture of the robot and the information of the scan pattern (the laser beam scan controlling section 25). The instruction for storing the information of the scan pattern section further includes an instruction for storing area information that correlates the processing spot disposed within a prescribed area on the workpiece to the information of the scan pattern of the processing spot (the inside-area welding data storing section 28). The instruction for retrieving the information of the scan pattern further includes an instruction for retrieving the information of the scan pattern from the area information when the laser beam scanning device is moved to the prescribed position that is disposed within an area corresponding to the prescribed area on the workpiece from which the laser beam scanning device can irradiate the laser beam at the processing spot within the prescribed area.

Third Embodiment

Referring now to FIGS. 14 to 17, a laser processing robot control apparatus in accordance with a third embodiment will now be explained. In view of the similarity between the first, second and third embodiments, the parts of the third embodiment that are identical to the parts of the first and/or second embodiments will be given the same reference numerals as the parts of the first embodiment and/or the second embodiment. Moreover, the descriptions of the parts of the third embodiment that are identical to the parts of the first and/or second embodiments may be omitted for the sake of brevity. The parts of the third embodiment that differ from the parts of the first and/or second embodiments will be indicated with a single prime (').

The laser processing robot control apparatus of the third embodiment differs from the laser processing robot control apparatus of the first or second embodiment in that, in the third embodiment, the scan pattern is irradiated at a plurality of welding spots in a prescribed area as the position of the laser beam scanning device 3 is moved while in the first or second embodiment the scan pattern was irradiated with the position of the laser beam scanning device 3 being fixed.

Since the configuration of the laser welding system to which the third embodiment of the present invention is applied is identical to those of the first embodiment illustrated in FIGS. 1 and 2, and the controlling system in the laser welding robot control apparatus is identical to that of the second embodiment illustrated in FIG. 7, a detailed explanation of the configuration thereof will be omitted.

In the third embodiment of the present invention, the data stored in the inside-area welding data storing section 28 is different from that of the second embodiment. Moreover, the movement of the laser beam scan controlling section 25 is slightly different from that of the second embodiment, which will be explained in more detail.

Figure 14:
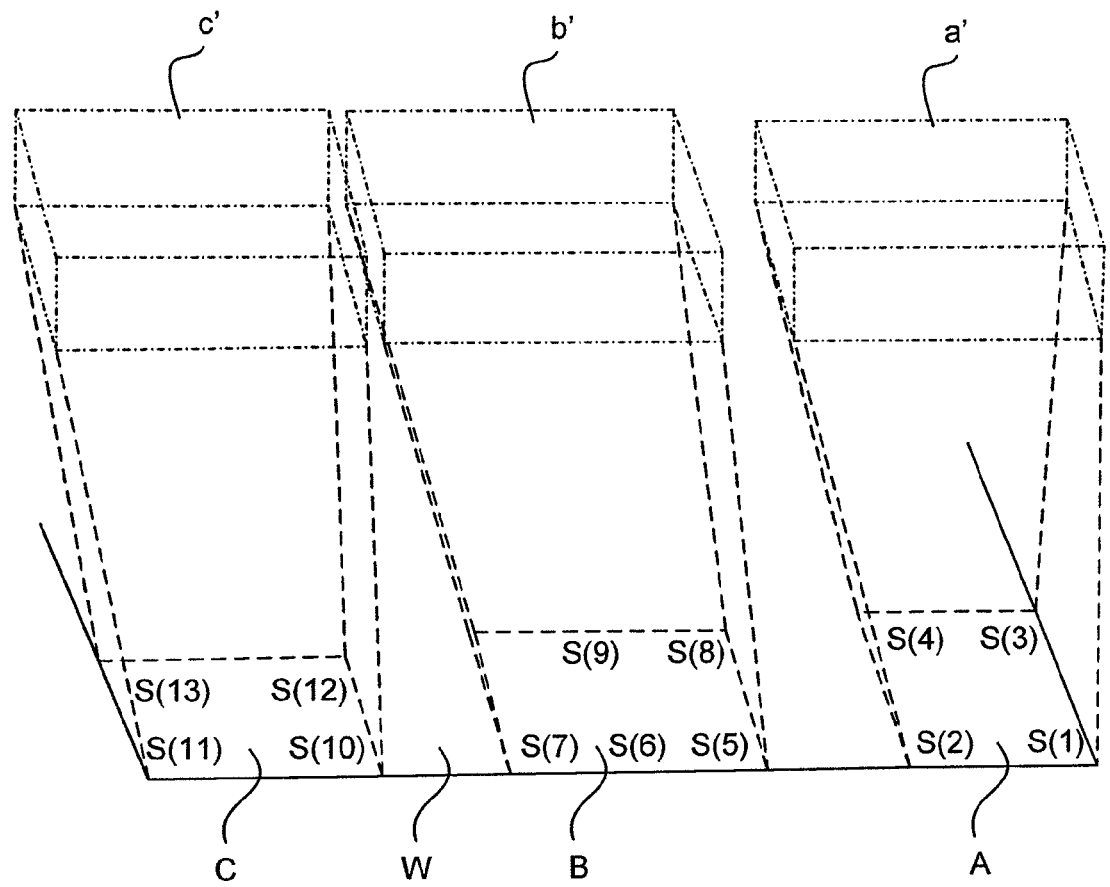
FIG. 14 is a schematic perspective view explaining grouping of a plurality of welding spots in a plurality of prescribed areas in accordance with the third embodiment of the present invention.

As illustrated in FIG. 14, the inside-area welding data storing section 28 is preferably arranged as a memory device that stores a plurality of welding spots S(1) to S(4) in a prescribed area A, a plurality of welding spots S(5) to S(9) in a prescribed area B, a plurality of welding spots S(10) to S(13) in a prescribed area C disposed on the workpiece W. Moreover, the inside-area welding data storing section 28 is further configured to store the rectangular parallelepiped three-dimensional areas a', b' and c' disposed in the movement path of the laser beam scanning device 3. The inside-area welding data storing section 28 is further configured and arranged to store the scan pattern of the laser beam 100 scanned at the welding spots S(1) to S(13) by the laser beam scanning device 3. Thus, the inside-area welding data storing section 28 constitutes the scan pattern storing section of the present invention in the third embodiment.

The welding spots S(1) to S(13) on the workpiece W are set by the CAD (not shown) and each of the welding points S(1) to S(13) is grouped and assigned to one of the areas A, B and C corresponding to the three-dimensional areas a', b' and c', respectively. As illustrated in FIG. 14, for example, the welding spots S(1) to S(4) are grouped together and assigned to the area A, the welding spots S(5) to S(9) are grouped together and assigned to the area B, and the welding spots S(10) to S(13) are grouped together and assigned to the area C. In the movement path of the laser beam scanning device 3, a three-dimensional region in which the welding spots S(1) to S(4) can be scanned as the position of the laser beam scanning device 3 is moved within the region is set as the three-dimensional area a'. Likewise, a three-dimensional region in the movement path of the laser beam scanning device 3 in which the welding spots S(5) to S(9) can be scanned as the position of the laser beam scanning device 3 is moved within the region is set as the three-dimensional area b'. Finally, a three-dimensional region in the movement path of the laser beam scanning device 3 in which the welding spots S(10) to S(13) can be scanned as the position of the laser beam scanning device 3 is moved within the region is set as the three-dimensional area c'. Each of the welding points S(1) to S(13) is grouped in the CAD system 9 (FIG. 1). Also, the three-dimensional areas a'; b' and c' are set by the CAD system 9 (FIG. 1). The information obtained from the CAD system 9 is stored in the inside-area welding data storing section 28 as an area table such as one illustrated in FIG. 15. The area table is preferably created for each of the three-dimensional areas a', b' and c'. Each of the three-dimensional areas a', b' and c' is defined by specifying coordinates of the left upper corner and the right lower corner of the corresponding three-dimensional area a', b' or c' as illustrated in the area table in FIG. 15.

The scan pattern stored in the inside-area welding data storing section 28 is the same as those in the first and second embodiments. More specifically, the scan pattern stored in the inside-area welding data storing section 28 can be of any size or shape. The scan pattern data stored in the inside-area welding data storing section 28 is also created by the CAD system 9 (FIG. 1) as well as the welding spot data. The welding spot data and the scan pattern data are individually and independently taught by the CAD system 9. In other words, the welding spot data and the scan pattern data can be treated as completely different data. For this reason, the welding spot storing section 21 and the inside-area welding data storing section 28 are separately provided in the third embodiment of the present invention.

The laser beam scan controlling section 25 is configured to input the S-shaped scan pattern having the size generated by the scan pattern generating section 24 when the laser beam scanning device 3 is passing through one of the three-dimensional areas a', b' and c' in which the laser beam can be irradiated at corresponding one of the groups of the welding spots S(1) to S(4) in the area A, the welding spots S(5) to S(9) in the area B, and the welding spots S(10) to S(13) in the area C disposed on the workpiece W. The laser beam scan controlling section 25 is further configured to calculate in real time the dot sequence coordinates (e.g., 80-dot sequence) of the S-shape drawn on the welding spots S(1) to S(13) on the areas A, B and C by taking into account the posture of the robot 1 determined by the robot controlling section 22. Then, the laser beam scan controlling section 25 is configured to move the reflective mirror 11 of the laser beam scanning device 3 based on the dot sequence coordinates calculated. The laser beam scan controlling section 25 is also configured to convert the welding spot center coordinate of the scan pattern and the dot sequence coordinates defined as the offset amounts from the welding spot center coordinate, both of which are represented in the coordinate system of the workpiece W, into the coordinates in the coordinate system of the robot 1.

Figure 16:
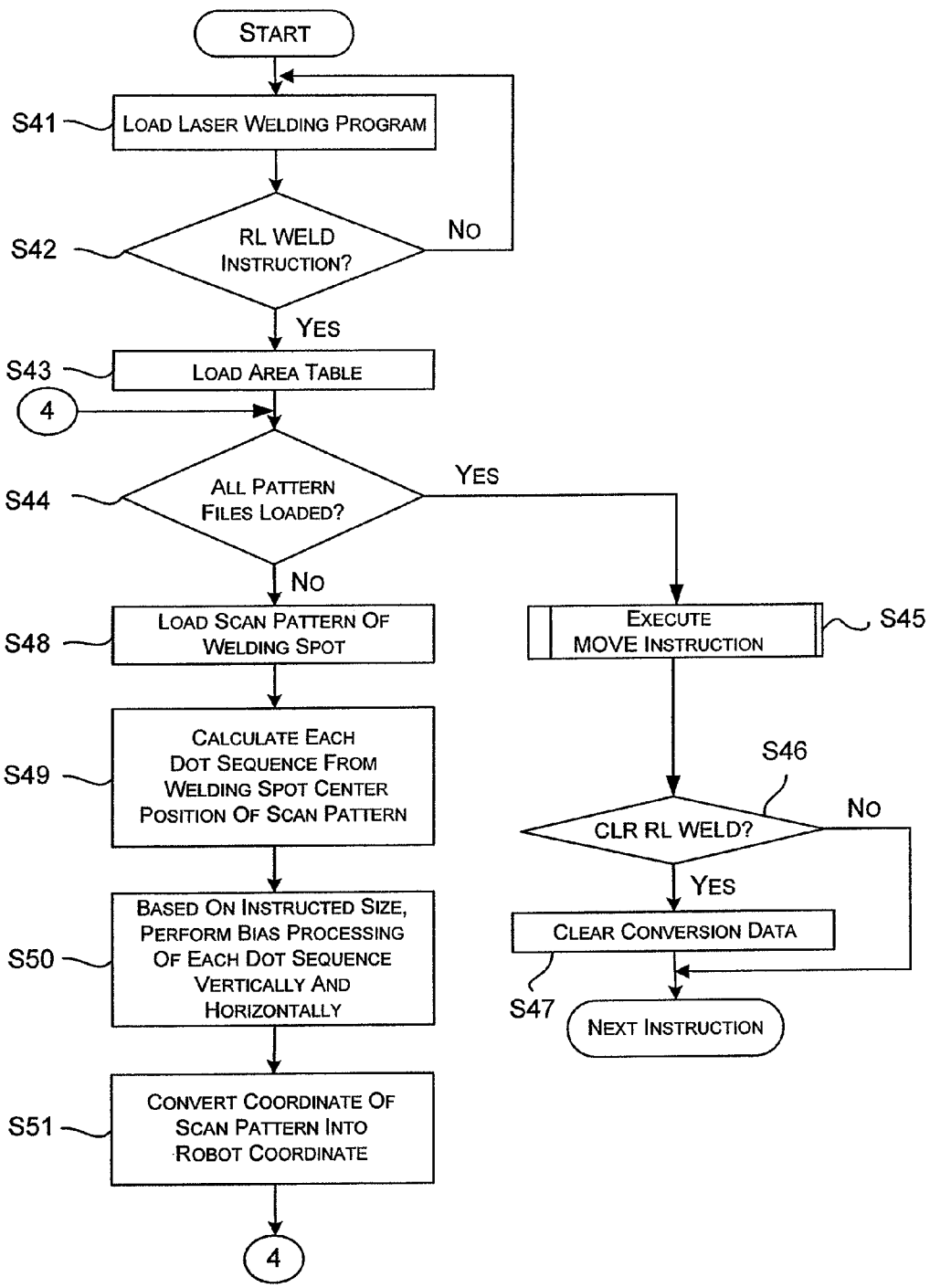
FIG. 16 is a flowchart illustrating a main routine of the control processing executed by the laser processing robot control apparatus in accordance with the third embodiment of the present invention.
Figure 17:
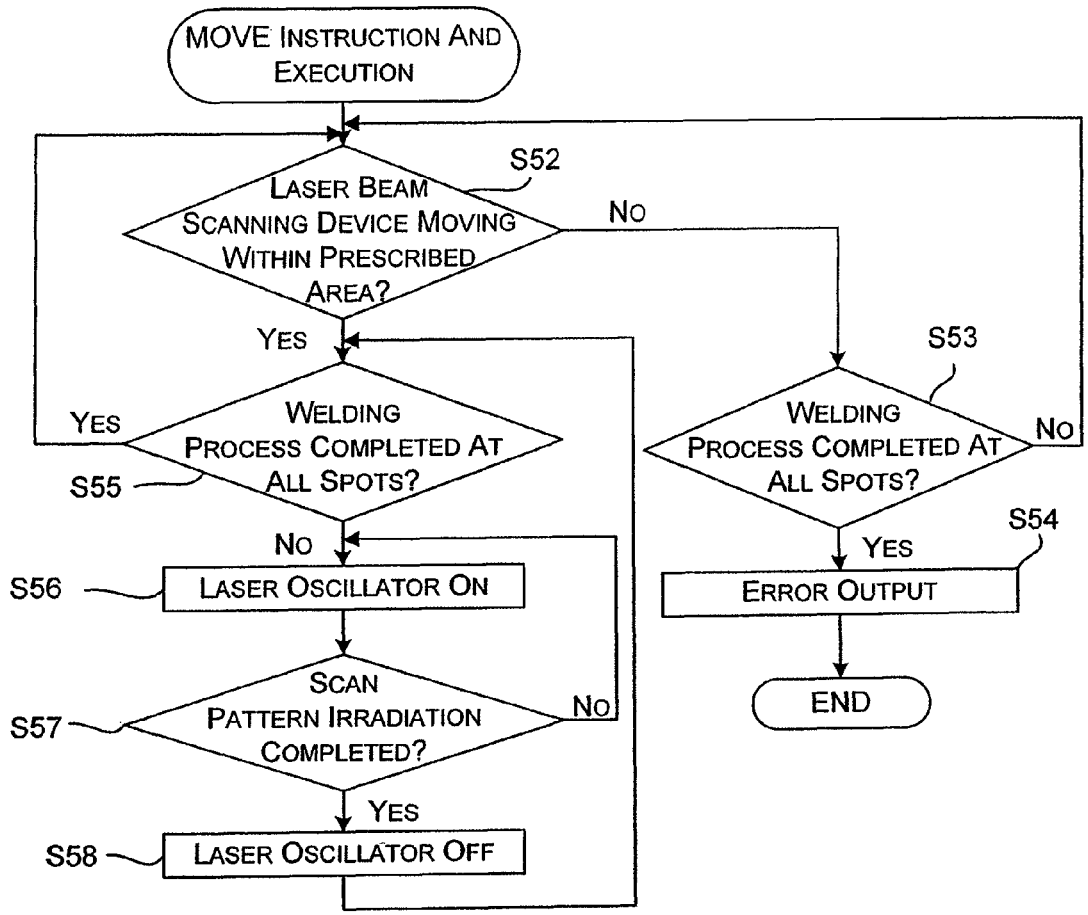
FIG. 17 is a flowchart illustrating a subroutine of the control processing executed by the laser processing robot control apparatus in accordance with the third embodiment of the present invention.

Referring now to the flowcharts of FIGS. 16 and 17, the operation of the laser processing robot control apparatus in accordance with the third embodiment of the present invention will be explained in detail. The flowcharts of FIGS. 16 and 17 illustrate an overall procedure for laser welding using the laser processing robot control apparatus of the third embodiment of the present invention. In the third embodiment, when the laser beam scanning device 3 is detected to enter one of the prescribed three-dimensional areas a', b' and c' set in advance while the robot 1 is moving along the movement path described in the teaching data, the laser welding starts at corresponding ones of the welding spots S(1) to S(13) (grouped in advance) that can be irradiated in sequence from the laser beam scanning device 3 as the laser beam scanning device 3 continues to move. Thus, in the third embodiment of the present invention, laser welding at all the welding spots in the three-dimensional areas a', b' and c' are performed in sequence while the laser beam scanning device 3 is moving.

In step S41, the robot controlling section 22 is configured to load the program for the laser welding. The program for the laser welding has a specific structure as follows:

--- n: RLWELD (area table number),
n + 1: MOVE (robot path specifying position 1, movement speed 1),
n + 2: MOVE (robot path specifying position 2, movement speed 2),
...
m: CLRRLWELD.

---

In step S42, the robot controlling section 22 is configured to determine whether or not an RLWELD instruction is present in the loaded program. If the RLWELD instruction is not present in the loaded program (No in step S42), the laser welding program is loaded again. If the RLWELD instruction is present in the loaded program (Yes in step S42), in step S43, the scan pattern generating section 24 is configured to load the area table stored in the inside-area welding data storing section 28 that corresponds to the area table number described in the RLWELD instruction. As mentioned above, the area table used in the third embodiment is configured as illustrated in FIG. 15. If the laser beam scanning device 3 is moving inside the three-dimensional area a' as illustrated in FIG. 14, the area table created for the three-dimensional area a' is loaded in step S42. The area table for the three-dimensional area a' contains information describing the scan pattern of the four welding spots (the welding spots S(1) to S(4)) disposed in the area A as illustrated in FIG. 14. In the process below, the scan pattern is drawn at the welding spots S(1) to S(4) disposed in the area A in this sequence while the laser beam scanning device 3 is moving in the three-dimensional area a'.

In step S44, the scan pattern generating section 24 is configured to determine whether or not all the pattern files necessary for welding all the welding spots S(1) to S(13) as illustrated in FIG. 14. In other words, in step S44, the scan pattern generating section 24 is configured to determine whether all the area tables for the three-dimensional areas a', b' and c' are loaded. Once all the pattern files are loaded (Yes in step S44), in step S45, a MOVE instruction in the program for the laser welding is executed, thereby moving the robot 1 as the instruction movement specified in the program. In step S46, the robot controlling section 22 is configured to determine whether a CLRRLWELD instruction is issued while the robot 1 is moving. If the CLRRLWELD instruction is issued (Yes in step S46) while the robot 1 is moving, in step S47, the robot controlling section 22 is configured to clear the conversion data and to move to the next instruction. If the CLRRLWELD instruction is not issued while the robot 1 is moving (No in step S46), the robot controlling section 22 is configured not to clear the conversion data and to move to the next instruction.

On the other hand, if all the pattern files have not been loaded (No in step S44), in step S48, the scan pattern generating section 24 is configured to load the scan pattern of the welding spots corresponding to the three-dimensional area in which the laser beam scanning device 3 is moving. For example, if the laser beam scanning device 3 is moving in the three-dimensional area a' as illustrated in FIG. 14, the scan pattern generating section 24 is configured to load the scan pattern of the welding spots S(1) to S(4) from the area table illustrated in FIG. 15 in step S48. With the third embodiment, the S-shaped scan pattern illustrated in FIG. 4 is loaded.

In step S49, the scan pattern generating section 24 is configured to calculate each coordinate of the 80 dots in the scan pattern based on the welding width, the welding length, the coordinates x, y, and z that are described in the coordinate system of the workpiece W in order to draw the scan pattern at the welding spots S(1) to S(4).

In step S50, the calculated coordinates of each of the 80 dots for the welding spots S(1) to S(4) are shifted to the vertical (welding length direction) and the horizontal (welding width) directions based on the welding width and the welding length described in the loaded program, thereby performing a bias process to generate the scan pattern of the required size.

In step S51, the laser beam scan controlling section 25 is configured to convert the coordinates of the 80 dots for each of the welding spots S(1) to S(4) in the scan pattern generated with respect to the coordinate system of the workpiece into the coordinate system of the robot 1. The laser beam scan controlling section 25 is configured to simultaneously input the posture of the robot 1 detected by the robot controlling section 22 and to calculate the movement of the reflective mirror 11 (angles of the reflective mirror 11 at various time points from the commencement to the end of the movement) in order to draw the scan pattern of the required size at the welding spot on the targeted workpiece W with the current posture of the robot 1.

While the MOVE instruction is carried out in step S45, in step S52 of FIG. 17, the robot controlling section 22 is configured to concurrently determine whether or not the laser beam scanning device 3 is moving within one of the three-dimensional areas a', b' and c'. When the laser beam scanning device 3 is not moving within one of the three-dimensional areas a', b' and c', the irradiation at any of the welding spots S(1) to S(13) is impossible regardless of how the reflective mirror 11 is moved. Therefore, if the laser beam scanning device 3 is not moving within one of the three-dimensional areas a', b' and c' (No in step S52), in step S53, the robot controlling section 22 is configured to determine whether the welding process is finished at all the welding spots S(1) to S(13). If the welding process is finished at all the welding spots S(1) to S(13) (Yes in step S53), an error is output, thereby finishing the process in step S54. If the welding process is not finished at all the welding spots S(1) to S(13) (No in step S53), the processing returns to step S52 to determine whether the laser beam scanning device 3 is moving within one of the three-dimensional areas a', b' and c'.

On the other hand, if the laser beam scanning device 3 is moving in one of the three-dimensional areas a', b' and c' (Yes in step S52), in step S55, the robot controlling section 22 is configured to determine whether the welding process is finished at all the welding spots S(1) to S(13). If the welding process is finished at all the welding spots S(1) to S(13) (Yes in step S55), the processing returns to step S52 to determine whether the laser beam scanning device 3 is moving within one of the three-dimensional areas a', b' and c'.

If the welding process is not finished at all the welding spots S(1) to S(13) (No in step S55), in step S56, the robot control apparatus 7' is configured to issue an activating instruction to the laser oscillator 5 to turn on the laser oscillator 5. When the laser oscillator 5 is turned on, the laser beam is irradiated at the reflective mirror 11 and the reflective mirror 11 is moved so that the laser beam is irradiated at the appropriate welding spot.

In step S57, the laser beam scan controlling section 25 is configured to determine whether or not the reflective mirror 11 completed the movement (i.e., whether or not irradiation of the scan pattern is completed). If the reflective mirror 11 has not completed the movement (No in step S57), the laser welding continues with the laser oscillator 5 being turned on. When the reflective mirror 11 completes the movement (Yes in step S57), the laser oscillator 5 is turned off in step S58 to return to the process in step S55.

Through the above process, the laser beam scanning device 3 can perform laser welding according to the scan pattern from the welding spot S(1) to the welding spot S(4) disposed in the area A, from the welding spot S(5) to the welding spot S(9) disposed in the area B, and from the welding spot S(10) to the welding spot S(13) disposed in the area C, while the laser beam scanning device 3 passes through the predetermined three-dimensional areas a', b' and c' (FIG. 14) during the laser welding operation. The laser processing robot control apparatus in accordance with the third embodiment of the present invention can also be arranged as a computer. In such case, the computer program used in the computer includes instructions for detecting a posture of the laser processing robot (the robot controlling section 22), storing information of a processing spot on the workpiece (the welding spot storing section 21), controlling a movement of the laser processing robot to selectively move the laser beam scanning device to a prescribed position from which the laser beam scanning device can irradiate the laser beam at the processing spot (the robot controlling section 22), a scan pattern storing section configured to store information of a scan pattern of the laser beam scanned by the laser beam scanning device (the inside-area welding data storing section 28), retrieving the information of the scan pattern stored in the scan pattern storing section when the laser beam scanning device is moved to the prescribed position, and controlling the laser beam scanning device to irradiate the laser beam at the processing spot in the scan pattern based on the posture of the robot and the information of the scan pattern (the laser beam scan controlling section 25). The instruction for controlling the movement of the laser processing robot further includes an instruction for controlling the movement of the robot to move the laser beam scanning device along a prescribed movement path (the robot controlling section 22). The instruction for retrieving the information of the scan pattern further includes an instruction for retrieving the information of the scan pattern from the area information stored in the scan pattern storing section when the laser beam scanning device is moving within a region in the prescribed movement path from which the laser beam scanning device can irradiate the laser beam at the processing spot (the inside-area welding data storing section 28). The instruction for controlling the laser beam scanning device further includes an instruction for controlling the laser beam scanning device in real time to irradiate the laser beam at the processing spot in the scan pattern (the laser beam scan controlling section 25).

In the first through third embodiments described above, laser welding is explained as an example of laser processing applied in the present invention. However, the present invention can be applied to other processing such as laser beam drilling and the like.

The laser processing robot control apparatus of the present invention simplifies the teaching operation in laser processing. Thus, the present invention can be used in the laser processing field.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting, recognizing or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A laser processing robot control system comprising:
   a robot;
   a laser beam scanning device movable in a three-dimensional direction with respect to the robot to scan a laser beam on a workpiece, the laser beam scanning device including a reflective minor arranged to selectively irradiate the laser beam inputted to the laser beam scanning device in the three-dimensional direction to scan the laser beam on the workpiece;
   a posture detecting section configured to detect a posture of the robot;
   a processing spot storing section configured to store information of a non-linear processing spot on the workpiece;
   a robot controlling section configured to perform a robot teaching operation to control a movement of the robot to selectively move the laser beam scanning device to a prescribed position from which the laser beam scanning device can irradiate the laser beam at the non-linear processing spot;
   a scan pattern storing section configured to store information of a non-linear scan pattern of the laser beam scanned by the laser beam scanning device, the non-linear scan pattern stored in the scan pattern storing section having a welding length, a welding width, a welding spot center coordinate and a plurality of dot sequence coordinates, the welding spot center coordinate and the dot sequence coordinates being represented in a coordinate system of the workpiece, and the dot sequence coordinates being defined as an offset amount from the welding spot center coordinate; and
   a laser beam scan controlling section configured to retrieve the information of the non-linear scan pattern, which includes a reflective mirror teaching operation, from the scan pattern storing section after the laser beam scanning device has been moved to the prescribed position by the robot controlling section, and the laser beam scan controlling section being further configured to control the laser beam scanning device to scan the laser beam in the non-linear scan pattern at the non-linear processing spot based on the posture of the robot detected by the posture detecting section and the information of the non-linear scan pattern retrieved from the scan pattern storing section such that the reflective mirror teaching operation is performed sequentially after and independently of the robot teaching operation.

2. The laser processing robot control system according to claim 1, wherein
   the scan pattern storing section is further configured to store area information that correlates the non-linear processing spot and at least one additional processing spot disposed within a prescribed area on the workpiece to the information of the non-linear scan pattern of the non-linear processing spot and an additional non-linear scan pattern of the additional non-linear processing spot, and
   the laser beam scan controlling section is further configured to retrieve the information of the non-linear scan pattern from the area information stored in the scan pattern storing section when the laser beam scanning device is moved by the robot controlling section to the prescribed position that is disposed within an area corresponding to the prescribed area on the workpiece from which the laser beam scanning device can irradiate the laser beam at the non-linear processing spot and the one additional non-linear processing spot within the prescribed area, and to control the laser beam scanning device to scan the laser beam at the non-linear processing spot in the non-linear scan pattern and the additional non-linear processing spot in sequence in the additional non-linear scan pattern.

3. The laser processing robot control system according to claim 2, wherein
   the scan pattern storing section is further configured to store the area information in which the prescribed area including the non-linear processing spot on the workpiece is set based on data created in a CAD system that is configured and arranged to perform the teaching operation of the robot.

4. The laser processing robot control system according to claim 2, wherein
   the robot controlling section is further configured to control the movement of the robot to move the laser beam scanning device along a prescribed movement path, and
   the laser beam scan controlling section is further configured to retrieve the information of the non-linear scan pattern from the area information stored in the scan pattern storing section when the laser beam scanning device is moving within a region in the prescribed movement path from which the laser beam scanning device can irradiate the laser beam at the non-linear processing spot and at least one additional non-linear processing spot, and to control the laser beam scanning device in real time to scan the laser beam at the non-linear processing spot in the non-linear scan pattern and the additional non-linear processing spot in the additional non-linear scan pattern.

5. The laser processing robot control system according to claim 1, wherein
   the information of the non-linear processing spot stored in the processing spot storing section and the information of the non-linear scan pattern stored in the scan pattern storing section are individually and independently stored so as to be separately taught by a CAD system.

6. The laser processing robot control system according to claim 1, wherein
   the laser beam scan controlling section is further configured to convert the processing spot center coordinate and the dot sequence coordinates into coordinates in a coordinate system of the robot.

7. The laser processing robot control system according to claim 1, wherein the scan pattern storing section is configured to store the information of the non-linear scan pattern including the dot sequence coordinates each defined as one of a two-dimensional offset amount and a three-dimensional offset amount from the processing spot center coordinate.

8. The laser processing robot control system according to claim 1, wherein
the scan pattern storing section is configured to store the information of the non-linear scan pattern having a dimension determined independently of a dimension of the non-linear processing spot on the workpiece.

9. The laser processing robot control system according to claim 8, wherein
the scan pattern storing section is further configured to store the information of the non-linear scan pattern as having at least one of an S-shape, a bar shape and a circular shape.

10. A laser processing robot control system comprising:
a robot;
a laser beam scanning device movable in a three-dimensional direction with respect to the robot to scan a laser beam on a workpiece;
a posture detecting section configured to detect a posture of the robot;
a processing spot storing section configured to store information of a non-linear processing spot on the workpiece;
a robot controlling section configured to control a movement of the robot to selectively move the laser beam scanning device to a prescribed position from which the laser beam scanning device can irradiate the laser beam at the non-linear processing spot;
a scan pattern storing section configured to store information of a non-linear scan pattern of the laser beam scanned by the laser beam scanning device, the non-linear scan pattern stored in the scan pattern storing section having a welding length, a welding width, a welding spot center coordinate and a plurality of dot sequence coordinates, the welding spot center coordinate and the dot sequence coordinates being represented in a coordinate system of the workpiece, and the dot sequence coordinates being defined as an offset amount from the welding spot center coordinate;
a laser beam scan controlling section configured to retrieve the information of the non-linear scan pattern stored in the scan pattern storing section when the laser beam scanning device is moved to the prescribed position by the robot controlling section, and to control the laser beam scanning device to scan the laser beam at the non-linear processing spot in the non-linear scan pattern based on the posture of the robot detected by the posture detecting section and the information of the non-linear scan pattern retrieved from the scan pattern storing section;
an instruction section configured to output a dimension of the non-linear scan pattern for the non-linear processing spot on the workpiece; and
a scan pattern generating section configured to generate an actual size scan pattern based on the dimension outputted from the instruction section and based on at least a scan pattern shape as part of the information of the non-linear scan pattern stored in the scan pattern storing section,
the laser beam scan controlling section being further configured to control the laser beam scanning device to scan the laser beam at the non-linear processing spot with the actual size scan pattern based on the posture of the robot detected by the posture detecting section and the actual size scan pattern generated by the scan pattern generating section.

11. A control method of a laser processing robot having a laser beam scanning device coupled to the laser processing robot such that the laser beam scanning device is movable in a three-dimensional direction with respect to the robot and configured and arranged to scan a laser beam at a workpiece, the control method comprising:
loading a program including instructions for performing laser processing with a robot teaching operation;
moving the robot in accordance with the program loaded to move the laser beam scanning device to a prescribed position from which the laser beam scanning device can irradiate the laser beam at a prescribed non-linear processing spot on the workpiece via a reflective mirror;
detecting a posture of the robot;
retrieving information of a non-linear scan pattern of the laser beam, which includes a reflective mirror teaching operation that was set in advance for the prescribed processing spot, after the laser beam scanning device has been moved to the prescribed position, the non-linear scan pattern being retrieved having a welding length, a welding width, a welding spot center coordinate and a plurality of dot sequence coordinates, the welding spot center coordinate and the dot sequence coordinates being represented in a coordinate system of the workpiece, and the dot sequence coordinates being defined as an offset amount from the welding spot center coordinate; and
controlling the laser beam scanning device to scan the laser beam in the non-linear scan pattern at the prescribed non-linear processing spot based on the posture of the robot detected and the information of the non-linear scan pattern retrieved such that the reflective mirror teaching operation is performed sequentially after and independently of the robot teaching operation.

12. The control method according to claim 11, wherein
the determining of whether the laser beam scanning device is disposed in the prescribed position includes determining whether the laser beam scanning device is moved to the prescribed position that is disposed within an area corresponding to a prescribed area on the workpiece including the prescribed processing spot from which the laser beam scanning device can irradiate the laser beam at the prescribed processing spot.

13. The control method according to claim 12, wherein
the determining of whether the laser beam scanning device is disposed in the prescribed position includes determining whether the laser beam scanning device is moving within a region from which the laser beam scanning device can irradiate the laser beam at the prescribed processing spot disposed within a prescribed area on the workpiece, and
the controlling of the laser beam scanning device includes controlling the laser beam scanning device in real time to scan the laser beam at the prescribed non-linear processing spot in the non-linear scan pattern.

14. The control method according to claim 11, wherein
the controlling of the laser beam scanning device includes converting the processing spot center coordinate and the dot sequence coordinates into coordinates in a coordinate system of the robot.

15. The control method according to claim 11, wherein the retrieving of the information of the non-linear scan pattern includes retrieving the information of the non-linear scan pattern including the dot sequence coordinates each defined as one of a two-dimensional offset amount and a three-dimensional offset amount from the processing spot center coordinate.

16. The control method according to claim 11, wherein
the retrieving of the information of the non-linear scan pattern includes retrieving the information of the non-linear scan pattern having a dimension determined independently of a dimension of the prescribed processing spot on the workpiece.

17. The control method according to claim 16, wherein
the retrieving of the information of the non-linear scan pattern includes retrieving the information of the scan pattern having one of an S-shape, a bar shape, and a circular shape.

18. A control method of a laser processing robot having a laser beam scanning device coupled to the laser processing robot such that the laser beam scanning device is movable in a three-dimensional direction with respect to the robot and configured and arranged to scan a laser beam at a workpiece, the control method comprising:
loading a program including instructions for performing laser processing;
moving the robot in accordance with the program loaded;
determining whether the laser beam scanning device is disposed in a prescribed position from which the laser beam scanning device can irradiate the laser beam at a prescribed non-linear processing spot on the workpiece;
detecting a posture of the robot;
retrieving information of a non-linear scan pattern of the laser beam that was set in advance for the prescribed processing spot, the non-linear scan pattern being retrieved having a welding length, a welding width, a welding spot center coordinate and a plurality of dot sequence coordinates, the welding spot center coordinate and the dot sequence coordinates being represented in a coordinate system of the workpiece, and the dot sequence coordinates being defined as an offset amount from the welding spot center coordinate;
controlling the laser beam scanning device to scan the laser beam in the non-linear scan pattern at the prescribed non-linear processing spot based on the posture of the robot detected and the information of the non-linear scan pattern retrieved;
outputting a dimension of the non-linear scan pattern for the prescribed processing spot on the workpiece; and
generating an actual size scan pattern based on the dimension outputted and based on at least a scan pattern shape as part of the information of the non-linear scan pattern retrieved,
the controlling of the laser beam scanning device including controlling the laser beam scanning device to scan the laser beam at the prescribed non-linear processing spot with the actual size scan pattern generated for the prescribed non-linear processing spot.

19. A control program medium for a computer to control a laser processing robot having a laser beam scanning device coupled to the robot such that the laser beam scanning device is movable in a three-dimensional direction with respect to the robot and configured and arranged to scan a laser beam at a workpiece, the computer program medium comprising instructions for:
detecting a posture of the robot;
storing information of a non-linear processing spot on the workpiece and a robot teaching operation;
controlling a movement of the robot in accordance with the robot teaching operation to selectively move the laser beam scanning device to a prescribed position from which the laser beam scanning device can irradiate the laser beam at the non-linear processing spot via a reflective mirror;
storing information of a non-linear scan pattern of the laser beam scanned by the laser beam scanning device in a scan pattern storing section, the information including a reflective mirror teaching operation, the non-linear scan pattern being stored having a welding length, a welding width, a welding spot center coordinate and a plurality of dot sequence coordinates, the welding spot center coordinate and the dot sequence coordinates being represented in a coordinate system of the workpiece, and the dot sequence coordinates being defined as an offset amount from the welding spot center coordinate;
retrieving the information of the non-linear scan pattern stored in the scan pattern storing section after the laser beam scanning device has been moved to the prescribed position; and
controlling the laser beam scanning device to scan the laser beam in the non-linear scan pattern at the non-linear processing spot based on the posture of the robot and the information of the non-linear scan pattern such that the reflective mirror teaching operation is performed sequentially after and independently of the robot teaching operation.

20. The control program medium according to claim 19, wherein
the instruction for storing the information of the scan pattern storing section further includes an instruction for storing area information that correlates the non-linear processing spot disposed within a prescribed area on the workpiece to the information of the non-linear scan pattern of the non-linear processing spot,
the instruction for retrieving the information of the non-linear scan pattern further includes an instruction for retrieving the information of the non-linear scan pattern from the area information when the laser beam scanning device is moved to the prescribed position that is disposed within an area corresponding to the prescribed area on the workpiece from which the laser beam scanning device can irradiate the laser beam at the non-linear processing spot within the prescribed area.

21. The control program medium according to claim 20, wherein
the instruction for controlling the movement of the robot further includes an instruction for controlling the movement of the robot to move the laser beam scanning device along a prescribed movement path,
the instruction for retrieving the information of the non-linear scan pattern further includes an instruction for retrieving the information of the non-linear scan pattern from the area information stored in the scan pattern storing section when the laser beam scanning device is moving within a region in the prescribed movement path from which the laser beam scanning device can irradiate the laser beam at the non-linear processing spot, and
the instruction for controlling the laser beam scanning device further includes an instruction for controlling the laser beam scanning device in real time to scan the laser beam at the non-linear processing spot in the non-linear scan pattern.

* * * * *